US012245726B2

(12) United States Patent
Giammanco et al.

(10) Patent No.: US 12,245,726 B2
(45) Date of Patent: Mar. 11, 2025

(54) CLEARING ROD

(71) Applicant: 2xl Corporation, Bolingbrook, IL (US)

(72) Inventors: Robert Louis Giammanco, Hinsdale, IL (US); Patrick Harris, Downers Grove, IL (US); Curtis Leroy Cruver, IV, Elmhurst, IL (US)

(73) Assignee: 2xl Corporation, Bolingbrook, IL (US)

( * ) Notice: Subject to any disclaimer, the term of this patent is extended or adjusted under 35 U.S.C. 154(b) by 267 days.

(21) Appl. No.: 17/517,696

(22) Filed: Nov. 3, 2021

(65) Prior Publication Data

US 2023/0142752 A1 May 11, 2023

(51) Int. Cl.

| | |
|---|---|
| ***B08B 9/043*** | (2006.01) |
| ***A47K 17/00*** | (2006.01) |
| ***B08B 9/027*** | (2006.01) |
| ***E03C 1/302*** | (2006.01) |
| ***E03F 9/00*** | (2006.01) |

(52) U.S. Cl.
CPC .............. *A47K 17/00* (2013.01); *B08B 9/027* (2013.01); *B08B 9/0436* (2013.01); *E03C 1/302* (2013.01); *E03F 9/002* (2013.01); *B08B 2209/04* (2013.01)

(58) Field of Classification Search
CPC ......... B08B 9/027; B08B 9/04; B08B 9/0436; B08B 9/045; B08B 2209/04; E03C 1/302; E03F 9/002; E03F 9/005
USPC .......................................................... D32/14
See application file for complete search history.

(56) References Cited

U.S. PATENT DOCUMENTS

| | | | | |
|---|---|---|---|---|
| 1,978,957 | A | 10/1934 | Pardieck | |
| 2,753,876 | A * | 7/1956 | Kurt | B08B 9/0322 285/107 |
| D296,882 | S | 7/1988 | Lopez | |
| 6,094,765 | A | 8/2000 | Askenase | |
| 6,179,928 | B1 | 1/2001 | Cariton | |
| D518,252 | S | 3/2006 | Wu | |
| D522,189 | S * | 5/2006 | McClaskey | D32/14 |
| 7,194,773 | B2 | 3/2007 | Bixby | |
| 8,307,468 | B2 | 11/2012 | Stein | |
| 8,359,696 | B1 | 1/2013 | Turner et al. | |
| 8,365,337 | B2 * | 2/2013 | Tash | B08B 9/045 15/104.03 |
| 8,776,281 | B2 | 7/2014 | Dondurur et al. | |
| 9,131,988 | B2 * | 9/2015 | Bagwell | A61M 16/0434 |
| 9,194,114 | B2 * | 11/2015 | Petry | E03C 1/302 |
| 9,987,027 | B2 * | 6/2018 | Ben-Ami | A61B 17/22031 |
| 10,786,268 | B2 * | 9/2020 | Ben-Ami | A61B 17/22031 |
| D901,794 | S * | 11/2020 | Schutte | D32/14 |
| 2004/0163166 | A1 | 8/2004 | Alldredge | |
| 2009/0293214 | A1 * | 12/2009 | Ackerman | B08B 9/0436 15/104.05 |
| 2013/0305469 | A1 * | 11/2013 | Rodriguez Sanjuan | A61B 1/122 15/104.05 |
| 2019/0275569 | A1 * | 9/2019 | Jertrum | B08B 9/0436 |

(Continued)

OTHER PUBLICATIONS

Windaze Piston Type Toilet Plunger as advertized on eBay and Amazon.

*Primary Examiner* — Randall E Chin

(57) ABSTRACT

A tool for dislodging and/or clearing obstructions and/or clogs from a passageway such as a toilet bowl, other plumbing fixture or conduit or the like. A handle portion allows the user to manipulate a blade portion, which is flexible yet firm, through the passageway and clear any clogging materials.

5 Claims, 18 Drawing Sheets

(56) References Cited

U.S. PATENT DOCUMENTS

2021/0170127 A1* 6/2021 Salinas ................. B08B 9/0436

* cited by examiner

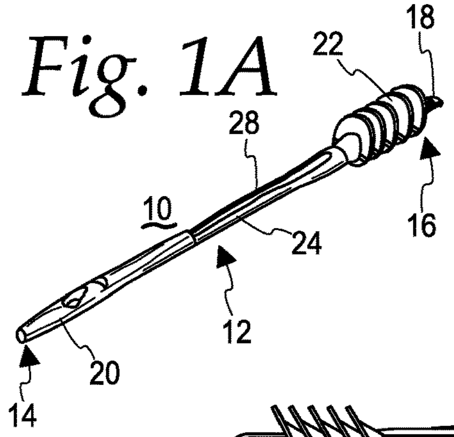
Fig. 1A
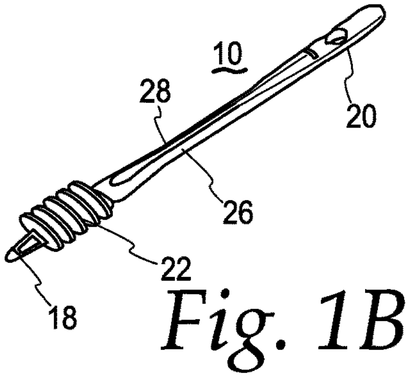
Fig. 1B
Fig. 2
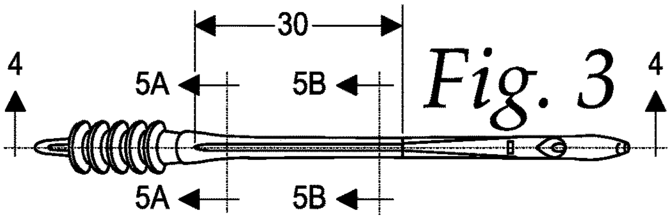
Fig. 3
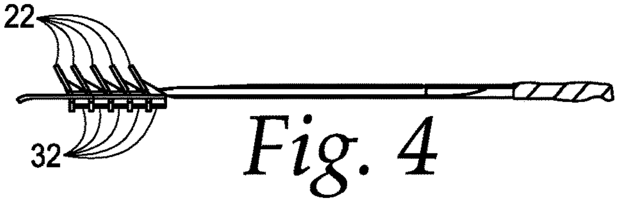
Fig. 4
Fig. 5A
Fig. 5B
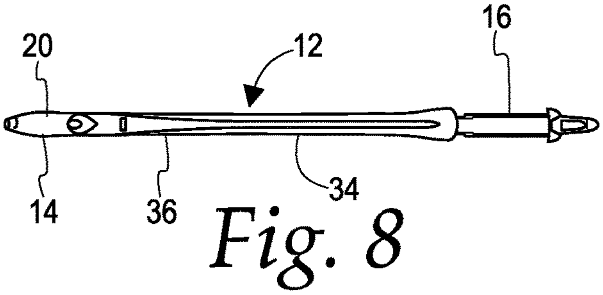
Fig. 8
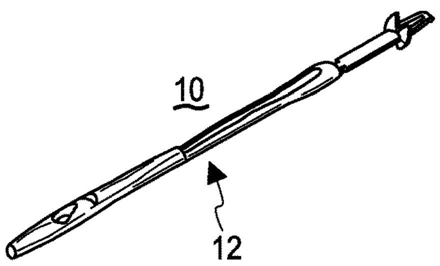
Fig. 6
Fig. 7

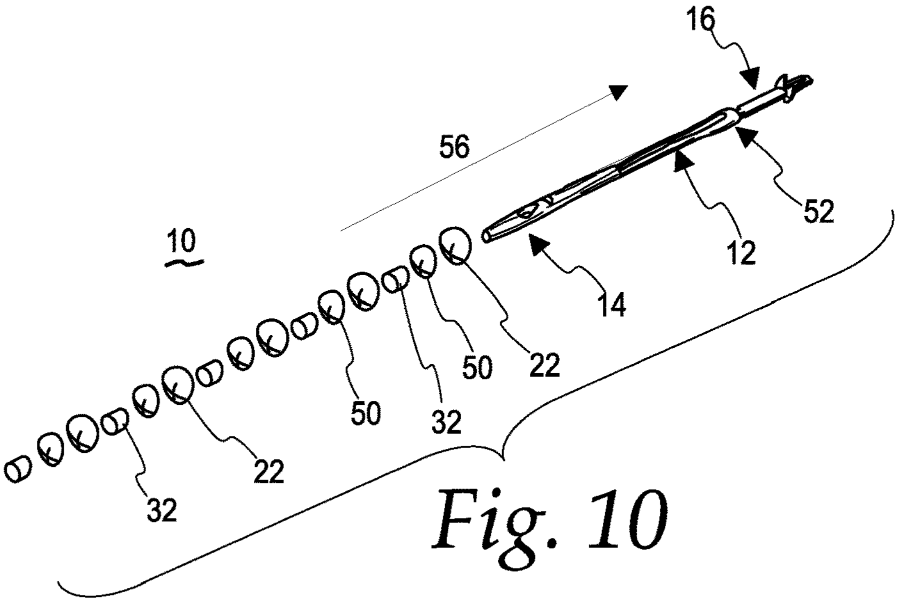
Fig. 10
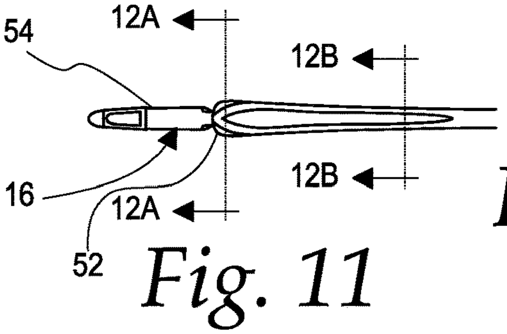
Fig. 11
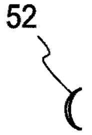
Fig. 12A
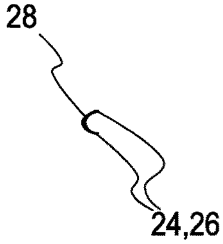
Fig. 12B
Fig. 13A
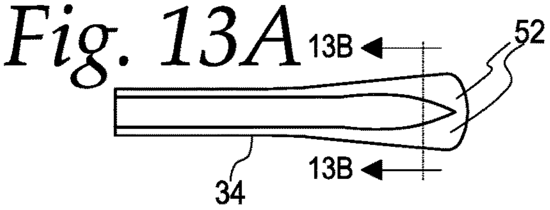
Fig. 13B
Fig. 14A
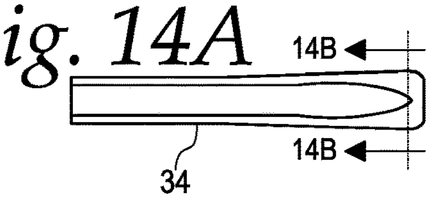
Fig. 14B
Fig. 15A
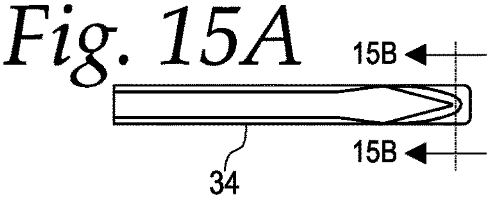
Fig. 15B Fig. 16
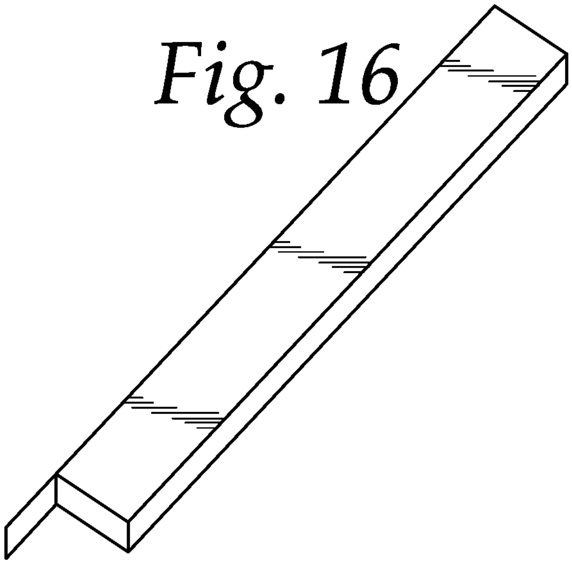
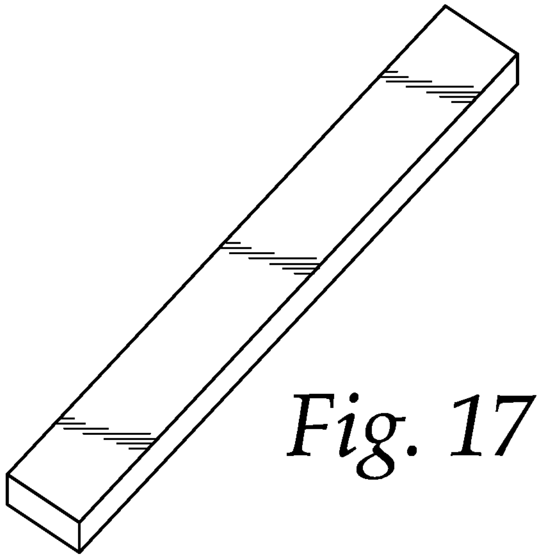
Fig. 17
Fig. 18
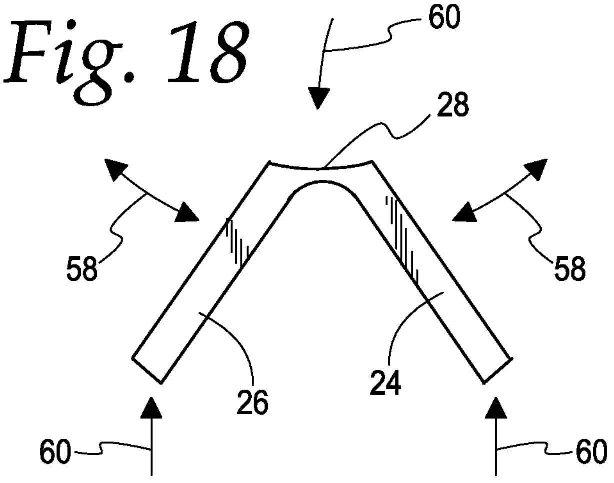

*Fig. 19*
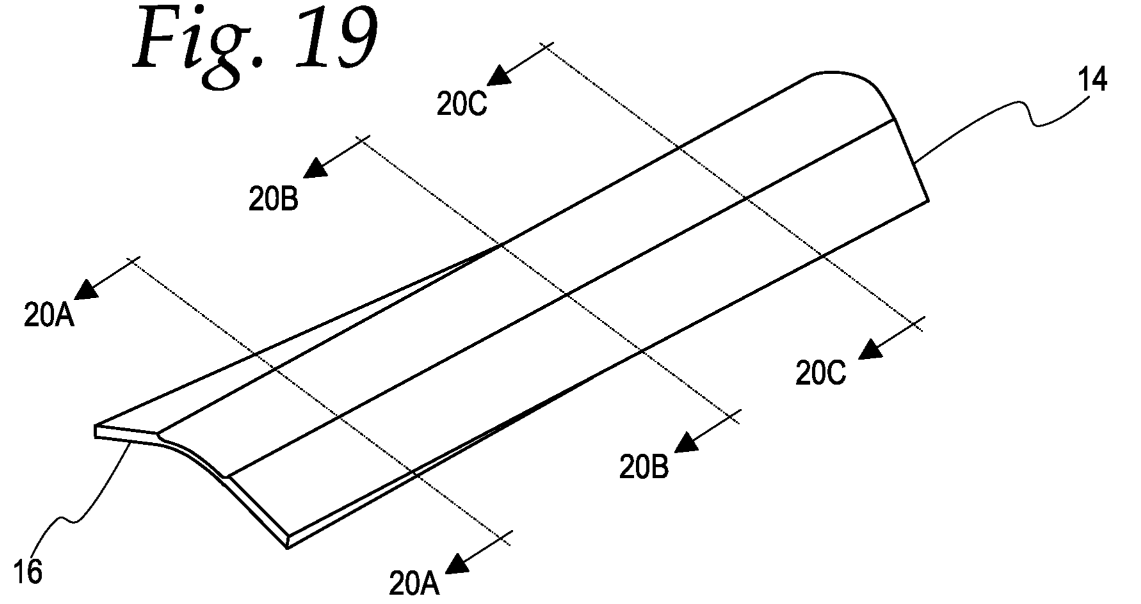
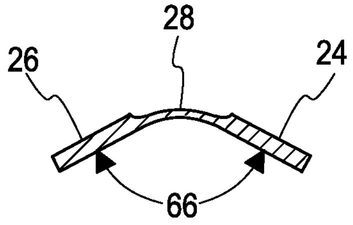
*Fig. 20A*
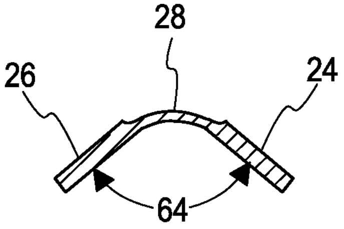
*Fig. 20B*
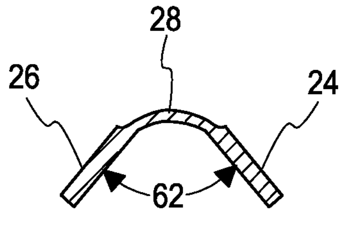
*Fig. 20C*

Fig. 21A
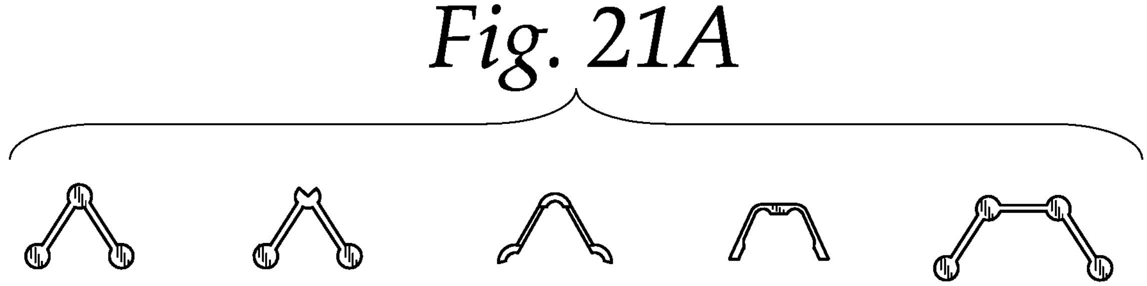
Fig. 21B
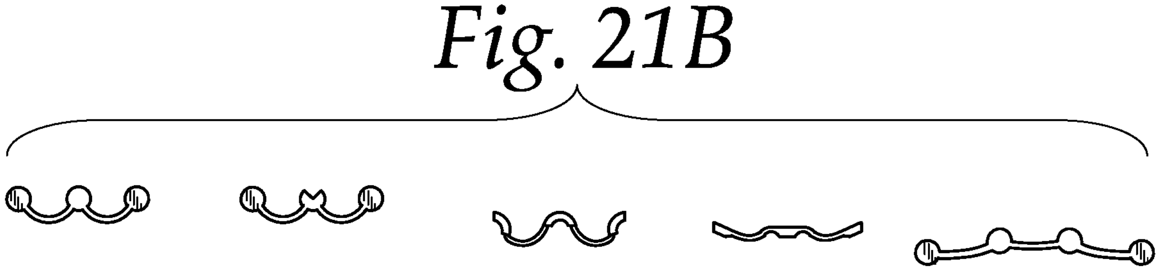
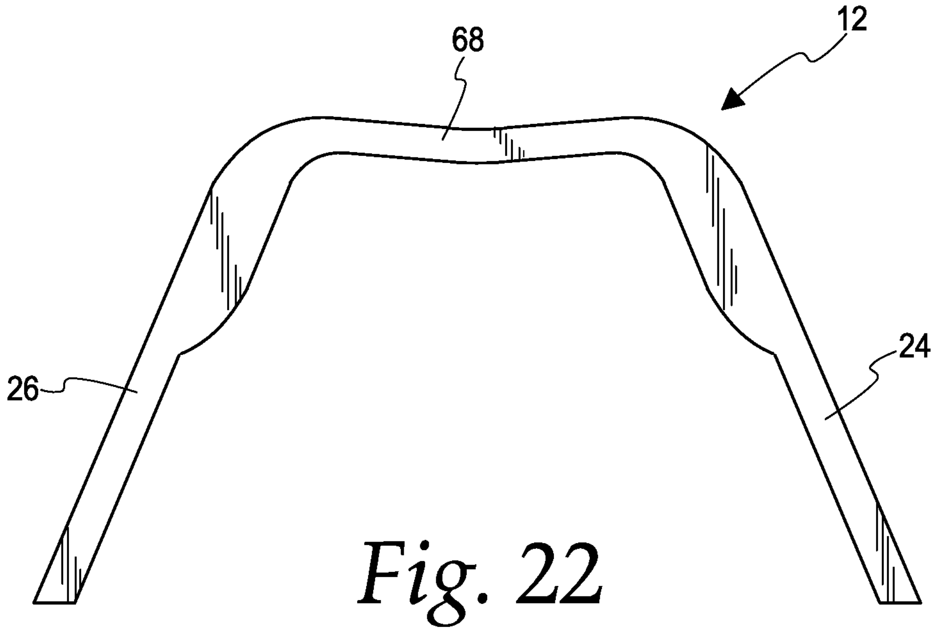
Fig. 22

Fig. 31
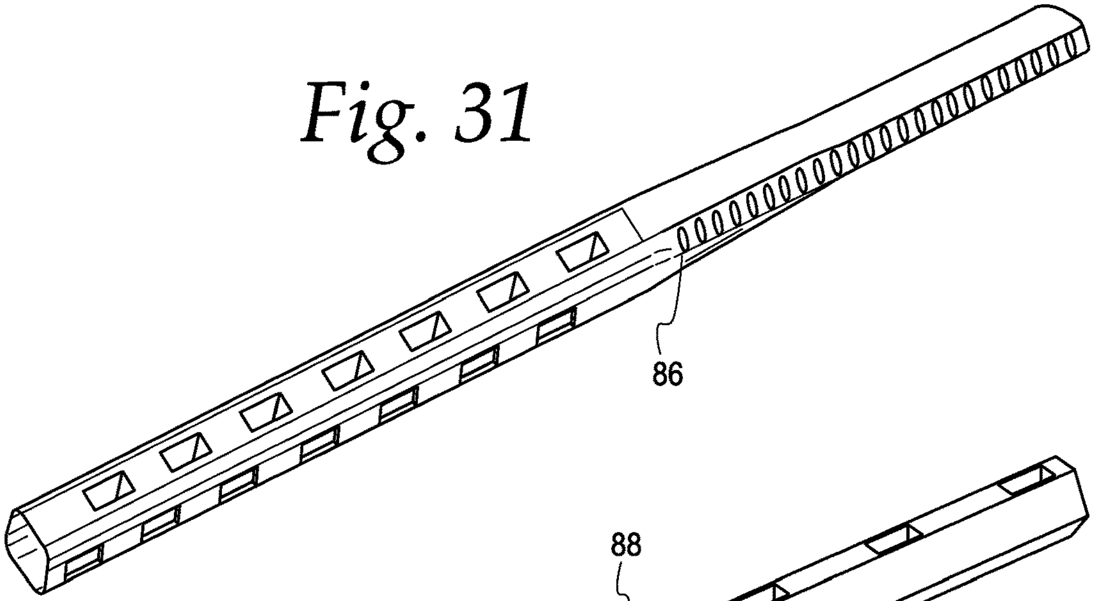
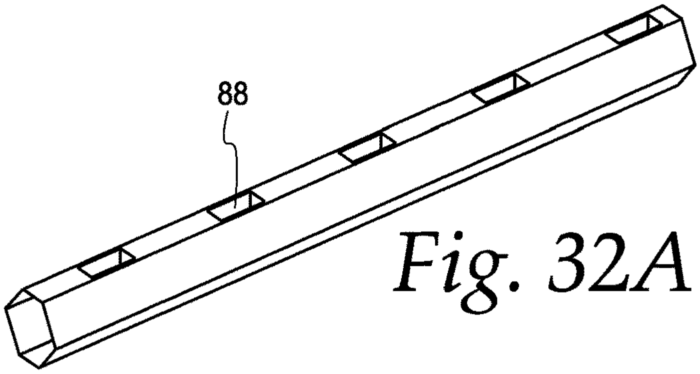
Fig. 32A
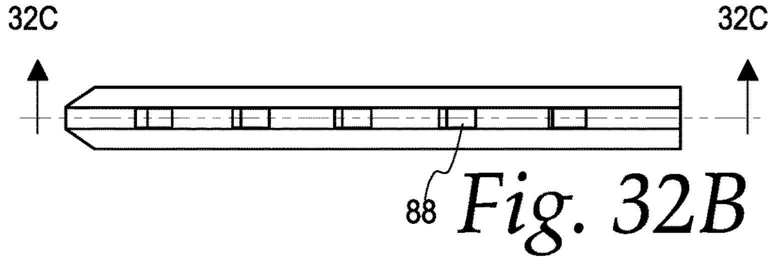
Fig. 32B
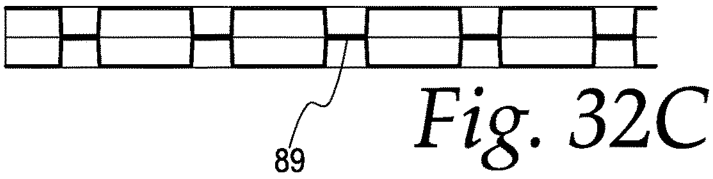
Fig. 32C
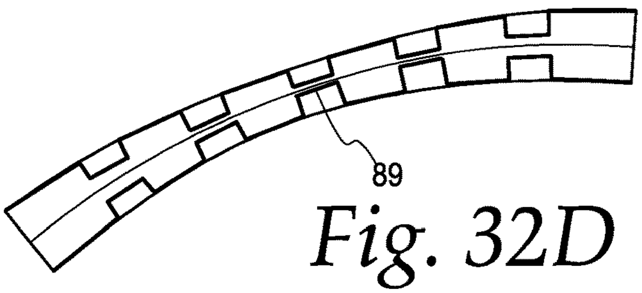
Fig. 32D Fig. 39C
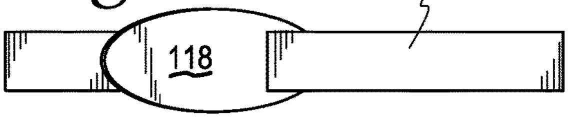
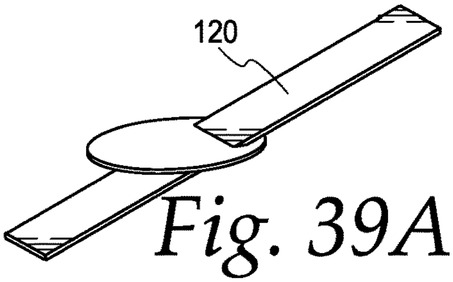
Fig. 39A
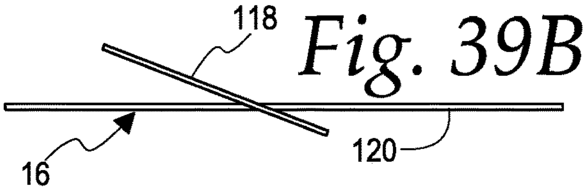
Fig. 39B
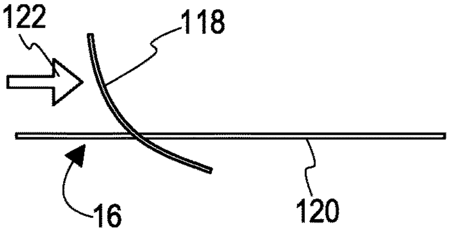
Fig. 39D
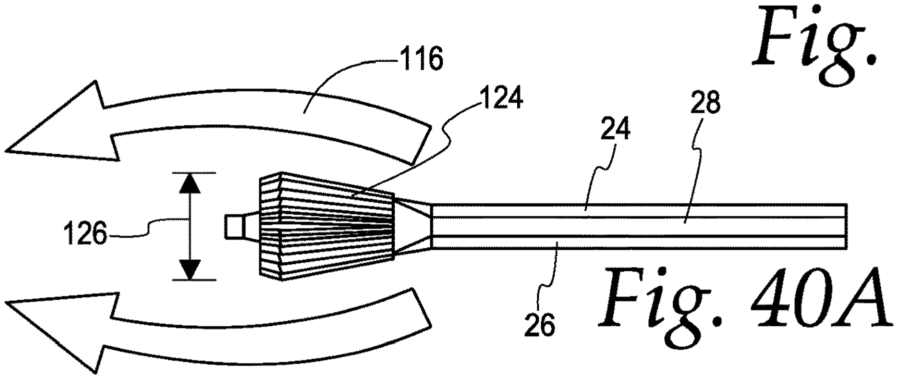
Fig. 40A
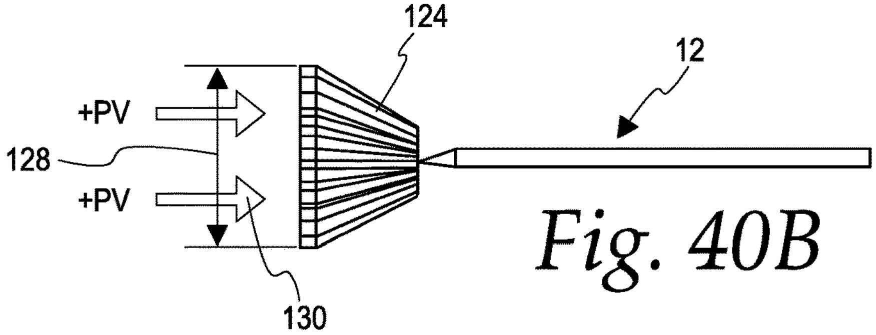
Fig. 40B
Fig. 40C
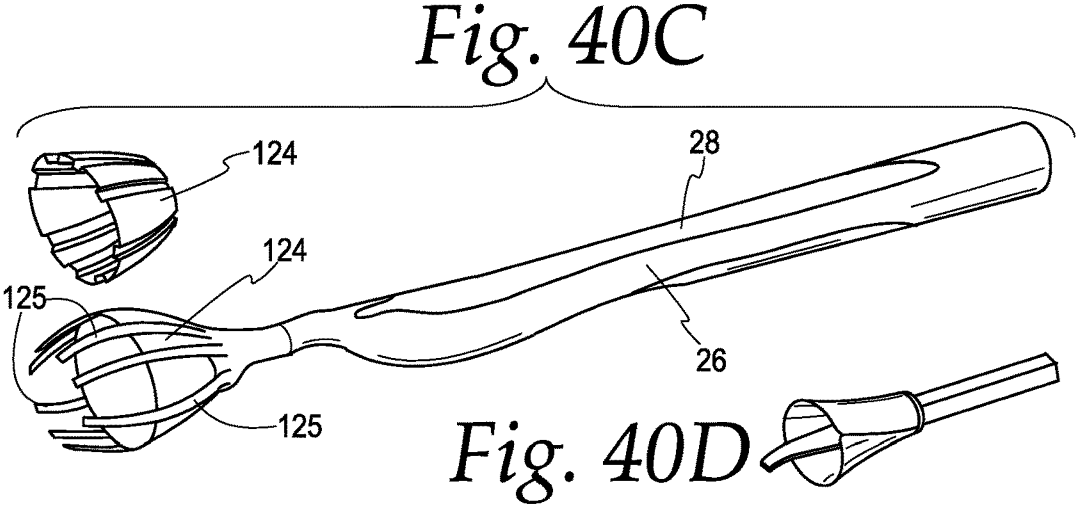
Fig. 40D Fig. 41A
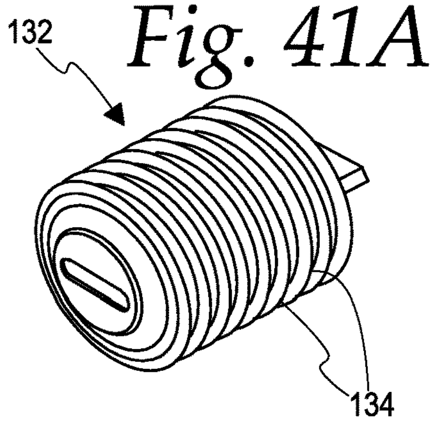
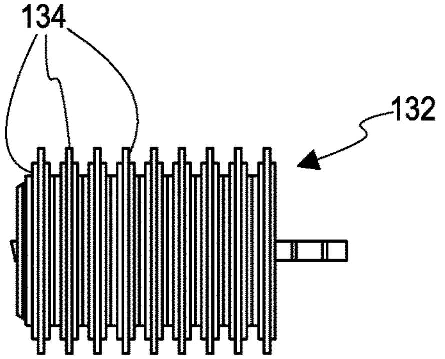
Fig. 41B
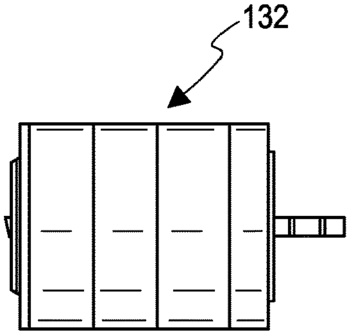
Fig. 41C
Fig. 41E
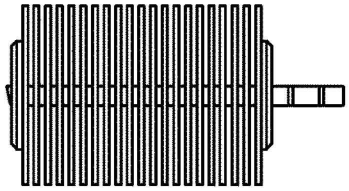
Fig. 41D
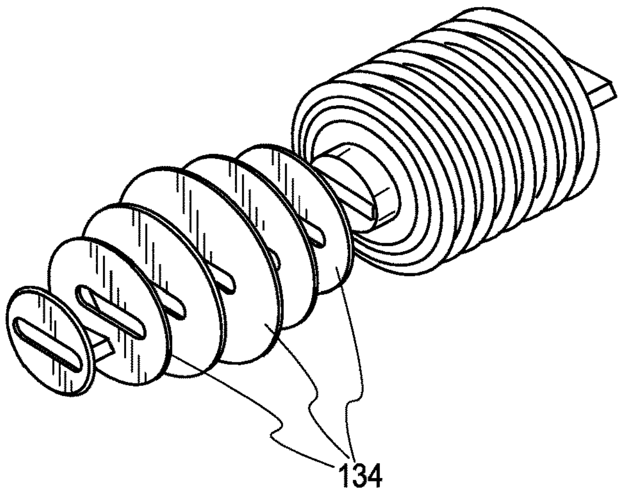
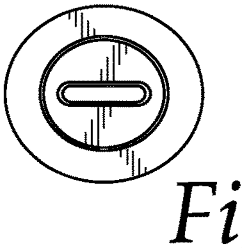
Fig. 41F

CLEARING ROD

CROSS-REFERENCE TO RELATED APPLICATION

None.

BACKGROUND OF THE INVENTION

I. Field of the Invention

The present disclosure relates generally to dislodging obstructions from a toilet bowl and other similar plumbing fixtures and drains, and more specifically to a device for removing toilet paper, waste, debris, sanitary napkins and other clogging materials from a toilet flush passageway in a toilet bowl.

II. Description of the Prior Art

Encountering a clogged toilet drain wherein an impediment blocks the toilet drain such that the water of the toilet bowl does not drain properly is unfortunately a common experience. Under such circumstances, a person typically reaches for a plunger to attempt to unclog the toilet drain. The most widely used plunger is a standard design having two components: a distal bottom of a generally vertical, wooden shaft attached to a crest of a plunger portion. A typical plunger portion is comprised of an inverted rubber cup with a flat rim or flange that hopefully seals over the mouth of a drain or pipe. A push of the shaft towards the mouth causes the cup to depress, which forces air and/or water therein towards the blockage. An effective plunge is accordingly dependent on both the vacuum formed by the seal and the degree of force used on the shaft.

There are many disadvantages associated with using a conventional plunger. The principal disadvantage is the typically inadequate ability to create a vacuum within the toilet drain whereby a pumping action with the plunger is used to create a suction. The impediment in the toilet drain is pushed and pulled via this alternating pressure and suction action until it is loosened and eventually flushed away. In many cases, a good seal cannot be formed and therefore pumping pressure is not optimized. Without optimized pressure, the plunger creates more splashing, and the impediment may not be removed in a timely manner, especially if it is of bulky size or dense nature.

Another disadvantage associated with using a plunger is that the plunger typically becomes soiled from being used in a clogged toilet. Furthermore, during use, contaminated water may be sprayed or spilled during the unclogging process, along with the contaminated water dripping off of the plunger following use thereof.

While plungers may be used for most clogs, their disadvantages, and the fact that they are not effective for all clogs, has led to prior art disclosures of a variety of snake-like devices, alternative suction-like plungers, brushes and other apparatus'. Additionally, for more serious clogs, harsh chemicals may be used. The common household user, however, tends to avoid the use of harmful and toxic chemicals whenever possible.

Perhaps the most effective way to clear a serious clog is through the use of a plumbing snake and/or a drain auger. However, such devices are typically only employed by plumbing professionals. As such, the common household user is at the disadvantage of needing to contact, schedule, and then pay for the services of a professional plumber. It would be desirable to provide the effectiveness of a professional plumber service call to the common household through the use of a new device. Therefore, there exists a need for a new and improved device for removing clogging materials from a toilet drain passageway.

Accordingly, it is a general object of this disclosure to provide a cost effective and easy to use device for dislodging clogs from a toilet drain.

It is another general object of the present disclosure to provide an apparatus for unclogging a toilet drain that can be utilized by any common household user.

It is a more specific object of the present disclosure to provide an apparatus for unclogging a toilet drain that can break up the impediment making it easier to traverse the passageway of a toilet bowl drain.

It is another general object of the present disclosure to provide a device for dislodging clogs from a toilet drain that is more sanitary than current means and methods.

It is a more specific object of the present disclosure to provide a disposable device for dislodging clogs from a toilet drain.

These and other objects, features and advantages of this disclosure will be clearly understood through a consideration of the following detailed description.

SUMMARY OF THE INVENTION

According to an embodiment of the present disclosure, there is provided a device for removing clearing materials from a passageway including a rod with a user engageable end and a tip end. The degree of rod flexibility increases from the user engageable end to the tip end.

There is also provided a device for dislodging obstructions from a passageway including a rod with a user engageable end and a tip end. The rod having two sides with a cooperating livable hinge coupling the sides relative to one another at an angle.

There is also provided a device for dislodging obstructions from a passageway including a rod with a user engageable end and a tip end. The rod having a geometrical cross-sectional profile that thickens from the tip end to the use engageable end.

BRIEF DESCRIPTION OF THE DRAWINGS

The present disclosure will be more fully understood by reference to the following detailed description of one or more preferred embodiments when read in conjunction with the accompanying drawings, in which like reference characters refer to like parts throughout the views and in which:

FIG. 1A is a rear perspective view of a toilet rod assembly according to the principles of an embodiment of the present disclosure.

FIG. 1B is a frontal perspective view of the assembly of FIG. 1A.

FIG. 2 is a side view of the assembly of FIG. 1A.

FIG. 3 is a top plan view of the assembly of FIG. 1A.

FIG. 4 is a cross-sectional side view taken along lines 4-4 of FIG. 3.

FIG. 5A is a cross-sectional view taken along lines 5A-5A of FIG. 3.

FIG. 5B is a cross-sectional view taken along lines 5B-5B of FIG. 3.

FIG. 6 is a rear perspective view of a molded rod of FIG. 1A.

FIG. 7 is a side view of the rod of FIG. 6.

FIG. 8 is a top plan view of the rod of FIG. 6.

FIG. 10 is an exploded rear perspective view of a toilet rod assembly according to the principles of the present disclosure.

FIG. 11 is a top plan view of the flex section of the rod of FIG. 6.

FIG. 12A is a cross-sectional side view taken along lines 12A-12A of FIG. 11.

FIG. 12B is a cross-sectional side view taken along lines 12B-12B of FIG. 11.

FIG. 13A is a top plan view of the flex section of FIG. 11.

FIG. 13B is a cross-sectional side view taken along lines 13B-13B of FIG. 13A.

FIG. 14A is a top plan view of the flex section of FIG. 11 as the body is flexed inward.

FIG. 14B is a cross-sectional side view taken along lines 14B-14B of FIG. 14A.

FIG. 15A is a top plan view of the flex section of FIG. 11 as the body and flares are flexed inward.

FIG. 15B is a cross-sectional side view taken along lines 15B-15B of FIG. 15A.

FIG. 16 is a frontal perspective view of an example of a stiff shaped rod for use with the rod assembly according to the principles of the present disclosure.

FIG. 17 is a frontal perspective view of an example of a flexible shaped rod for use with the rod assembly according to the principles of the present disclosure.

FIG. 18 is a cross-sectional view of an example of a living hinge rod for use with the rod assembly according to the principles of the present disclosure.

FIG. 19 is a frontal perspective view of a transitioning shaped rod for use with the rod assembly according to the principles of the present disclosure.

FIG. 20A is a cross-sectional side view taken along lines 20A-20A of FIG. 19.

FIG. 20B is a cross-sectional side view taken along lines 20B-20B of FIG. 19.

FIG. 20C is a cross-sectional side view taken along lines 20C-20C of FIG. 19.

FIG. 21A illustrates cross-sectional views of numerous alternate embodiments of the rod corner profiles of the present disclosure in original shape.

FIG. 21B illustrates views of the corner profiles of FIG. 21A in flattened shape.

FIG. 22 is an enlarged cross-sectional view of an alternate rod corner tapered profile of the present disclosure.

FIG. 31 is a perspective view of a transverse perforated hinge embodiment of the toilet rod assembly according to the principles of the present disclosure.

FIG. 32A is a perspective view of a crush box embodiment of the toilet rod assembly according to the principles of the present disclosure.

FIG. 32B is a top plan view of the toilet rod assembly of FIG. 32A.

FIG. 32C is a cross-sectional view of the toilet rod assembly taken along lines 32C-32C of FIG. 32B.

FIG. 32D is a bend illustration of the toilet rod assembly of FIG. 32C.

FIG. 39A is a perspective view of an alternate expander-based rod embodiment of the present disclosure.

FIG. 39B is a side view of the rod of FIG. 39A.

FIG. 39C is a top plan view of the rod of FIG. 39A.

FIG. 39D is a side view of the rod of FIG. 39A in an expanded state.

FIG. 40A is a top plan view of an alternate expander rod embodiment of the present disclosure.

FIG. 40B is a side view of the rod of FIG. 40A in the expanded state.

FIG. 40C is a perspective view of the expander enclosed within a cage like protector.

FIG. 40D is a perspective view of an alternate overlapping leaf type expander rod embodiment of the present disclosure.

FIG. 41A is a perspective view of a stacked array tip embodiment of the toilet rod assembly according to the principles of the present disclosure.

FIG. 41B is a side view of the tip of FIG. 41A.

FIG. 41C is a side view of an alternate embodiment of the tip of FIG. 41A.

FIG. 41D is a side view of the stacked array with disks spaced apart for illustration purposes.

FIG. 41E is a perspective view of a partially exploded array of variable sized disks.

FIG. 41F is a frontal view of the tip of FIG. 41A.

DESCRIPTION OF THE PREFERRED EMBODIMENTS

Figure 9A:
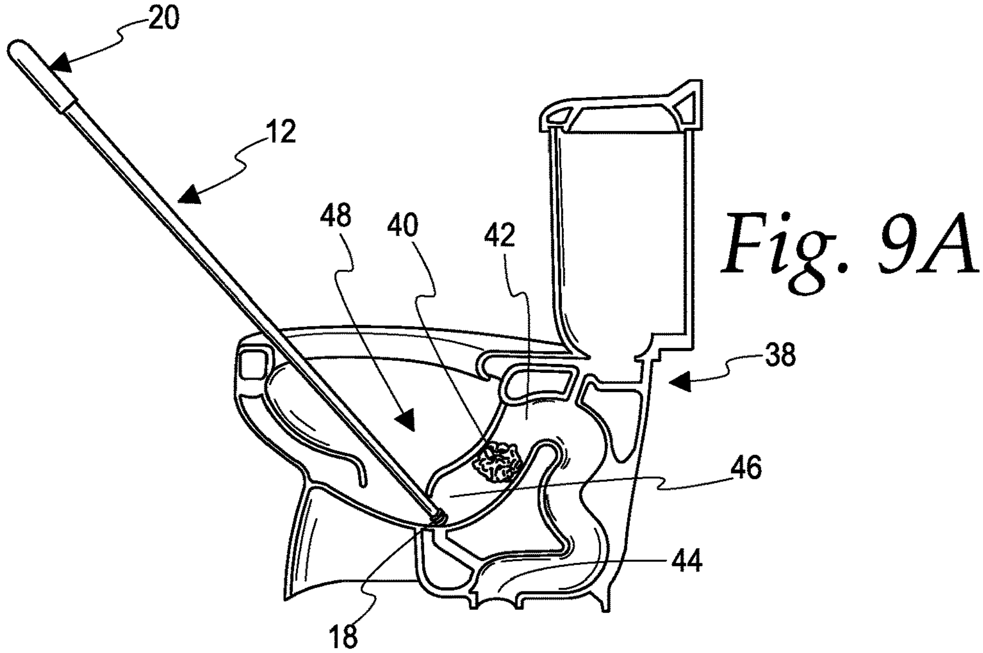
FIG. 9A is a schematic environmental side view in section illustrating a toilet rod assembly according to the principles of the present disclosure.

Multiple embodiments of the subject disclosure will now be described with the aid of numerous drawings. Unless otherwise indicated, use of the term "rod" will be understood to include a blade, rod, snake, as well as other devices for insertion into a drain, and in particular a toilet drain. Similarly, the use of the term "tip" will be understood to include a front end, engagement end and head end of the rod. Furthermore, the use of the term "handle" will be understood to include, but not be limited to, a grippable section of the rod or hand grips and the like for use with the rod.

In any event, turning now to the figures, and in particular FIGS. 1A and 1B, a preferred embodiment of the toilet rod assembly 10 includes a blade portion 12, a back end 14 and a front end 16 with a tip 18. The back end 14 is preferably for user engagement and may accordingly include a handle 20. The front end 16, and in particular the tip 18, is for drain blockage engagement and may include a drain wall engaging member, preferably one or more flexible disks, 22. The blade portion 12 preferably includes a living hinge comprising a right wing 24, a left wing 26 and a middle hinge 28. This living hinge allows the main wings of the blade to move with respect to one another. Movements of the wings are a result of the toilet rod traversing a bend in the toilet drain passageway. In such a condition, the surfaces of the toilet drain exert a force on the corners of the rod profile and accordingly transform the local shape of the rod from the stiff angular shape to a flatter, more flexible shape. When the rod is removed from the drain and the flattening forces are removed, the living hinge will spring back to its original angular shape.

FIGS. 2-5B illustrate the toilet rod assembly 10 in additional views to better detail the embodiment. The rod includes a living hinge area 30 which allows the rod to flatten so it can bend more easily when it encounters turns in the toilet trap (for example) yet straighten to a stiffer non-flat geometry that allows the transmission of higher pushing forces that can create higher pressures for dislodging clogs. The front end 16 includes flexible disks 22 and spacers 32 to separate the disks 22. These non-rigid disks 22 can deform to conform to trap/drain geometry so that the rod can work in a variety of applications. The water pressure acting on the disks can deform them into contact with the trap/drain walls to create a better seal and build higher pressures for dislodging clogs.

FIGS. 6-8 illustrate the toilet rod assembly 10 without any wall engaging member near the front end 16 so as to better detail the rod, and in particular the blade 12 portion thereof. The living hinge geometry of this embodiment allows a rod that would normally be stiff against bending to now bend easily in reaction to bends in a toilet trap. This living hinge geometry is contained in the flex section 34 of the rod. The front section 16 holds the disks, backup disks and spacers (for example). An ergonomic handle 20 on the back-end section 14 provides the user interface. Finally, a transition section 36 connects the back-end section 14 to the flex section 34.

Figure 9B:
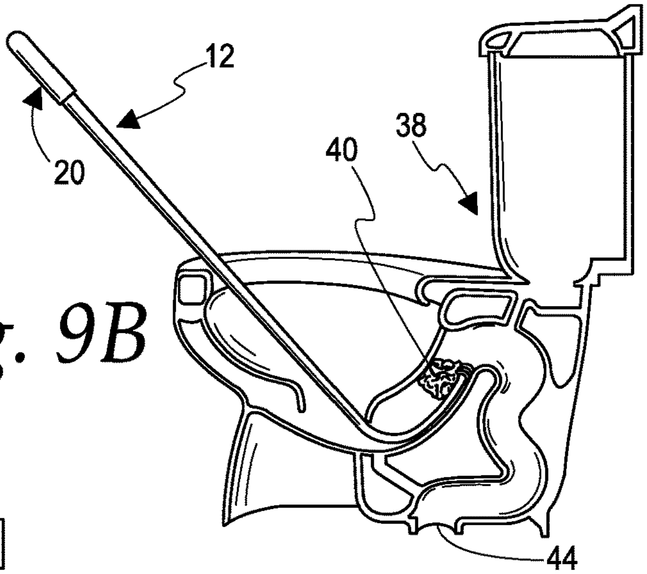
FIG. 9B is a schematic environmental side view in section illustrating the toilet rod assembly of FIG. 9A engaging a toilet drain blockage.
Figure 9C:
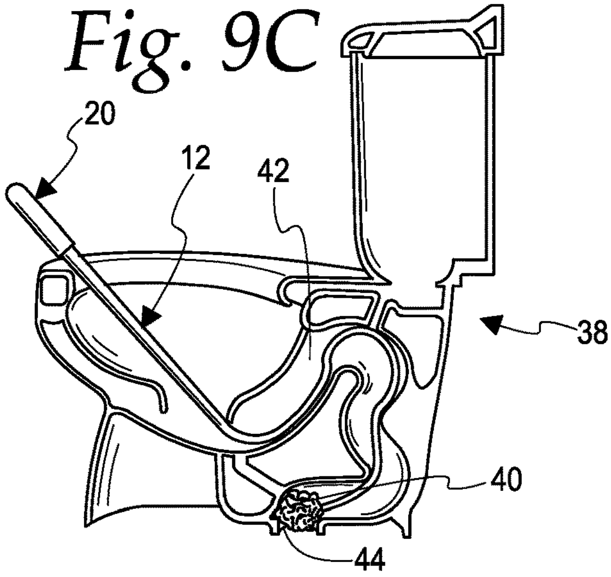
FIG. 9C is a schematic environmental side view in section illustrating the toilet rod assembly of FIG. 9A clearing the toilet drain blockage.

FIGS. 9A-9C are illustrative of the toilet rod assembly in use to clear an obstruction in a toilet drain. In particular, a conventional toilet fixture 38 is shown having an obstruction 40 lodged in the toilet trap 42, where most obstructions occur. This obstruction clogs the fixture and prevents the toilet from flushing through the drain 44. In order to clear the obstruction, the user grabs the optional handle 20 of the toilet rod assembly and pushes the tip end 18 of the blade 12 through the back end 46 of the bowl 48 of the toilet. The flexible end of the blade flexes with the bends of the trap 42 until it encounters the obstruction 40 (FIG. 9B). At this point, the tip either breaks or dislodges the obstruction or pushes it through the trap 42 and to the drain 44. The tip can also break through or deform the clog without dislodging the clog. This would allow some water to start to flow and may result in the dislodging of the clog after the rod is withdrawn from its first or later stroke. If the obstruction 40 is initially broken up or otherwise dislodged, the toilet flushes, the drain clears and the user removes the blade from the bowl 48. If the obstruction 40 is not initially cleared, the user withdraws the blade at least partially from the trap section and continues to push the blade 12 through the bends of the toilet until the obstruction 40 is broken up, dislodged or pushed through the drain 44 (FIG. 9C), at which point the user removes the blade from the bowl 48. However long the blade needs to traverse the bends, it remains stiff but flexible enough to do so via this living hinge type embodiment. It is the action enhanced by the change from the flexibility near the tip that allows the blade to traverse bends easily to a stiffer section in the middle and a firm handle section to prevent the blade from buckling under the force that produces the desired results. It is the ability for a specific section of the rod, anywhere along the length of the rod, to transform from a stiff section to a flexible section as required. In other words, sections of the rod that are not bending are stiff enough to prevent buckling under high pushing forces while sections that need to bend are flattened into a more flexible shape. As noted and shown, the degree of rod flexibility increases from the user engageable end to the tip end of the rod. In any event, when it is removed, the blade returns to its original shape.

Figure 9D:
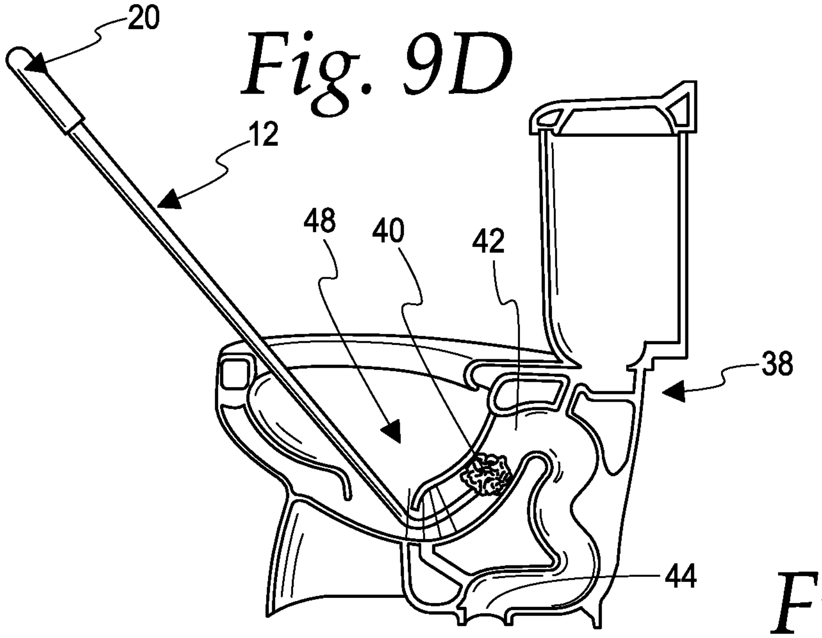
FIG. 9D is a schematic environmental side view in section illustrating an alternate toilet rod assembly according to the principles of the present disclosure engaging a toilet drain blockage.
Figure 9E:
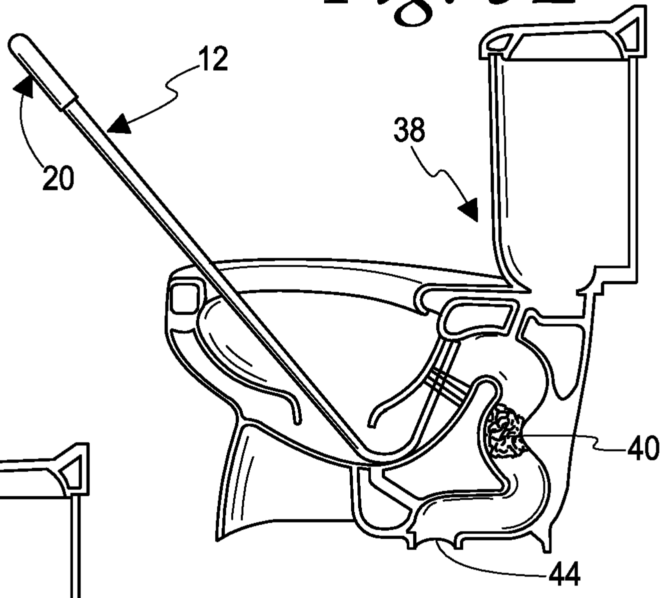
FIG. 9E is a schematic environmental side view in section illustrating the toilet rod assembly of FIG. 9D working the drain.
Figure 9F:
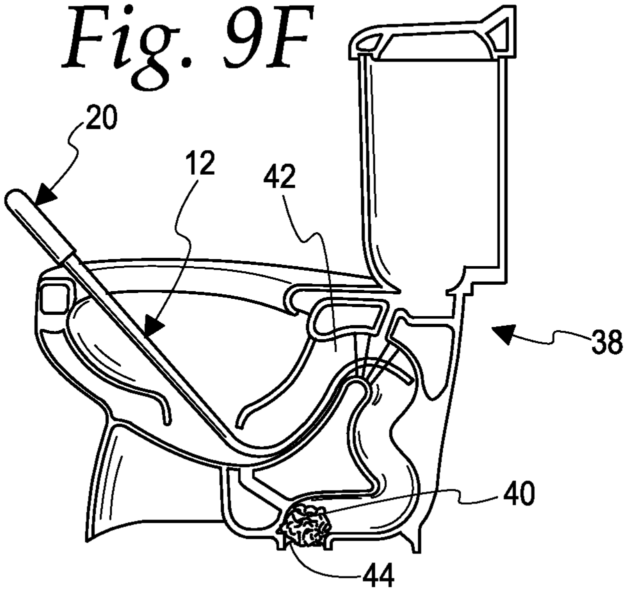
FIG. 9F is a schematic environmental side view in section illustrating the toilet rod assembly of FIG. 9D clearing the toilet drain blockage.

It should be appreciated that the front end of the blade in FIGS. 9A-9C do not include any wall engaging members. Indeed, rod design may be utilized without such members. However, depending upon the particular embodiment, there may be advantages to the use of same. Wall engaging members help build pressure upon entering the trap passage that may dislodge clogs. By building this pressure, the rod may not even need to actually contact the clog to dislodge, as shown in FIGS. 9D-9F.

A contemplated trumpet shaped rod flex section creates the smooth fairing effect when pulling the rod out of the trap. This smooth overall shape allows reduced stiffness in the transition area. This results in a generally smoother in and out stroking of the rod and a cleaner fairing area to keep disks from snagging on trap features. The simple geometry of the trumpet shaped flare transition rod also creates a much simpler parting line in the plastic part that can be molded in a much simpler injection mold reducing mold costs and future mold maintenance costs, Turning now to the assembly and exploded view of FIG. 10, the toilet rod assembly of a preferred embodiment is detailed. This embodiment allows disks 22, backup disks 50 and spacers 32 to be assembled by pushing them onto the rod from the back end 14 and past the flared area 52 of the front end 16. This may be better shown in the top view of FIG. 11 and the cross-sectional views of the flare (FIG. 12A) and the wings (FIG. 12B). The wall engaging members will be positioned between the flares 52 and a flange 54 on the front end 16. These disks may be of a simple fabric, sponge or textile material, or the like so long as they are soft enough to give good adaptability to different sized traps and provide the sealing action that allows the rod to build pressure and clear clogs. This design allows the disks and spacers to assemble over the deformable rod and become trapped in position by the rod features alone without added components and/or fasteners.

Numerous more complex versions of this rod assembly design can be created using added components and fasteners. Additionally, rather than having multiple pieces (deformable disk, backing disk, spacer, etc.) push assembled 56 onto the rod, a one-piece disk cartridge may be used. Molding in one-piece simplifies assembly and procurement as compared to the numerous disks, spacers and backing disks of FIG. 10. One such disk array can be made from any flexible and deformable material such as foam or the like.

With disk-based wall engaging rod tips it may be desirable to load disk and spacer components from the handle side of the rod in order to maintain a one piece rod (see FIG. 10). The benefit of the one-piece rod is that the danger of inadvertent disassembly of a multi piece rod during usage is eliminated. The back side loadable feature is achieved in part by the flexibility of the living hinge which, in addition to allowing the rod to flatten in an outward direction, will allow the rod to fold inward tighter when an object with a central hole, such as a disk or spacer, is passed over the rod from the handle end. This living hinge action works in the central body of the flex section; however it is generally desirable for the flex section to flare out near the area of the flex section to tip transition. If this flared out section retains the thick wing geometry of the main body of the flex section it cannot fold inward enough to allow the disks and/or spacers to pass over completely. By thinning the corners of the flared out area significantly disks and/or spacers can pass over the flared out area by folding the thinned out sections of the flares inward and move to the desired location on the tip. Once the disks and/or spacers pass over the flared section the living hinge and the thinned-out flare material rebound to their original shape trapping the disks and the spacers in the correct location on the tip.

The back end loadable front-end pieces assembly may be better understood via partial views of the flex section 34 of the rod, and in particular FIGS. 13A-15B. FIGS. 13A and 13B illustrate the flex section 34 as molded. FIGS. 14A and 14B illustrate the body flexed at the living hinge. FIGS. 15A and 15B illustrate the body and the deformable and perhaps thinned flares 52 flexed inward. Accordingly, when in the folded position, the reduction in size allows the front-end tip components to be loaded over the handle end of the rod. Then, when released, the deformable flare expands out to the original unfolded wide position trapping the tip components on the front end 16.

Most workable rod concepts will require a tip section on one end of the living hinge and a handle section on the other end of the living hinge. Once any living hinge-based flex section is attached to a more or less rigid handle or a tip then the living hinge and the attached wings become immobilized at the point of attachment and do not regain full living hinge functionality until some distance away from the point of attachment. In actuality, the wing material is being twisted or undergoing torsion near the area of attachment and the living hinge material contributes very little to the rod function in this area. As a result, the living hinge can be eliminated or significantly reduced in this area. This concept can be built upon to intentionally create torsion beams near the points of attachment. These torsion beams can be used to tune the stiffness of twisting and the degree of longitudinal bending stiffness in the local area. As before, such degree of rod flexibility increases from handle to tip end. This torsion tip geometry is used to eliminate stiff points along the rod as it is bent longitudinally and create a smoother bending rod and eliminate the rod sticking at certain points as it is cycled in and out of the trap.

Turning back to the unique properties of the blade. It will be understood that it is the ability of the blade to remain stiff enough to dislodge a clog while being flexible enough to traverse a trapway to encounter the clog. An ideal toilet rod would therefore be stiff enough to exert a high pushing force on the clog, as illustrated by the stiff shape of FIG. 16, and flexible enough to get around the corners in a drain pipe, as illustrated by the flexible shape of FIG. 17. Accordingly, one feature of the present disclosure seeks to combine the properties of FIGS. 16 and 17 into one blade by incorporating a living hinge into the stiff shape so that it can deform into something closer to the flexible shape when it encounters a corner in a drain pipe.

This so-called living hinge feature, as shown in the cross-sectional view of the blade of FIG. 18, allows the right wing 24 and the left wing 26 of the rod to move with respect to each other. Movement 58 is the result of the toilet rod attempting to traverse a corner in the toilet. In this condition the toilet drain pipe surfaces exert a force 60 on the corners of the toilet rod profile. This force transforms the local shape of the toilet rod from the stiff angular shape to a flatter, more flexible shape, through the living hinge. Once the rod is removed from the trapway, and more specifically when these flattening forces are removed, the living hinge will spring back to the initial shape.

FIG. 19 depicts a practical working implementation embodiment of the blade 12 portion of the toilet rod assembly. This blade 12 has a flat angle at the engaging front-end 16 to start around corners easily and then quickly transitions to a stiffer more acute angle at the handle back end 14 with a significant portion of the rod length being at a stiff angle. The cross-sectional views of FIGS. 20A-20C are better illustrative of the transition of the shape of the blade portion 12. In particular, FIG. 20C shows a stiff angle 62 of approximately 90 degrees between the right wing 24 and the left wing 26 of the blade near the handle end 14. This stiff angle 62 preferably comprises most of the length of the blade until it transitions into intermediate angles, for example the approximate 120 degree intermediate angle 64 as shown in FIG. 20B. Finally, intermediate angles culminate at the flatter angle 66, approximately 145 degrees, as shown in FIG. 20A near the tip of the blade. Accordingly, the toilet rod is stiff enough to exert a high pushing force on clogs via the stiff shape of stiff angle 62, and flexible enough to traverse around bends and angles of the toilet drain passageway via the flexible shape of flatter angle 66, with gradual transitioning angles, including intermediate angle 64 there between.

The living hinge 28 enables the blade 12 to combine both the stiff properties of the stiff angle 62 with the flexible properties of the flexible angle 66 into one blade. The flatter angle at the blade tip allows the blade to start around corners of the toilet drain easily, and the quick transition to a more stiff shape allows the pushing force necessary to remove clogs. It is the unique ability of the blade to have a bend occur in a localized area of the rod as needed by the side load presented by the user while the rest of the rod stays firm. This localized flexible area travels along the rod in response to the top and bottom of the rod contacting the surfaces of the bends in the toilet trap as it is pushed deeper into the toilet drain. When pulled back out of the drain the blade returns to its original form.

This living hinge could also be in the form of a mechanical hinge design that would achieve the same effect as a one-piece living hinge design. For example, a snap in feature or a traditional hinge pin could be used. It is envisioned that the spring effect could be achieved via plastic tabs that would get deflected as the hinge gets pushed towards a flat shape. However, traditional torsion springs, curved springs or flat springs could also be utilized.

As shown and described, the so-called living hinge need not be a physical hinge. Indeed, the same result can be achieved through a profile change. The discussed alternate blade embodiments have noted such profile changes, but additional profiles could also achieve the desired results. For example, the living hinge action may be achieved through a gradual thickening of the profile.

Alternatively, the living hinge may comprise the majority of the body of the blade. Furthermore, the living hinge profile may simply blend into a thicker edge. Additionally, the angles between the wings are not critical to the function. Rather it is the ability of the rod to transform from a stiff angle to a more flexible flatter angle when required. In particular, it is the blade's unique ability to have a bend occur in a localized area of the rod as needed by the side load presented by the user causing the blade to locally transform into a more flexible flatter angle shape while the rest of the rod remains in the stiffer narrower angle shape required to exert higher pushing forces. In use, flattening can occur anywhere along the length of the profile as a result of opposing forces being applied to the top and bottom of the profile when the rod encounters bends in the toilet trap and makes physical contact with these bends. The prebend areas and the profile itself will rebound to the original molded profile when the opposing forces are removed as a result of local areas of the rod losing contact with the toilet trap bends.

It will be understood that the main crux of the disclosure remains that the rod flattens and therefore becomes less resistant to bending in response to contacting bends in the toilet trap. The flattened sections bend around corners more easily due to a reduced section thickness. In the living hinge concepts, the reduction is accomplished by bending the wings around a flexible central hinge. Alternatively, and as shown in FIG. 16, a stiffer corner profile concept wherein the reduction in thickness is achieved by deforming the long thin members that connect the stiff corner geometry is shown. In particular, FIGS. 21A and 21B illustrates numerous rod profiles in cross section both in original shape (FIG. 21A) and in a corresponding flattened shape (FIG. 21B). These profiles utilize an alternative method of achieving the flattening and resulting section depth reduction that allows the rod to transform from a stiff shape to a more flexible flatter shape that can progress around the bends in a toilet trap easier. Flattening can therefore occur anywhere along the length of the profile as a result of opposing forces being applied to the top and/or bottom of the profile. The profile will then rebound to the original (as molded) profile when the opposing forces are removed so long as the material used has enough restitution and the stresses in the deformed state are below the short term yield point of the material. The use end or tip of the rod is preferably molded closer to the fully flattened shape to allow the tip to start around any bends easier.

An alternate embodiment of the blade is illustrated by FIG. 22. This alternate blade 12, shown as an exemplar of the original shape version of FIG. 21, as before, includes a right side 24 and a left side 26. However, rather than having a middle hinge portion (FIG. 21), this blade has a top portion 68 and incorporates a gradual overall flattening from handle end to tip end. As such, the flatter blade tip portion allows the blade to start around corners of the drain more easily, and then the quick transition to the more stiff profile shape allows the necessary pushing force. Although, as before, the blade flexibility may increase from handle to tip, it is the localized flexibility of the blade in response to it contacting the surfaces of the bends in the pipe that provide the unique ability to be flexible yet firm.

Figure 23:
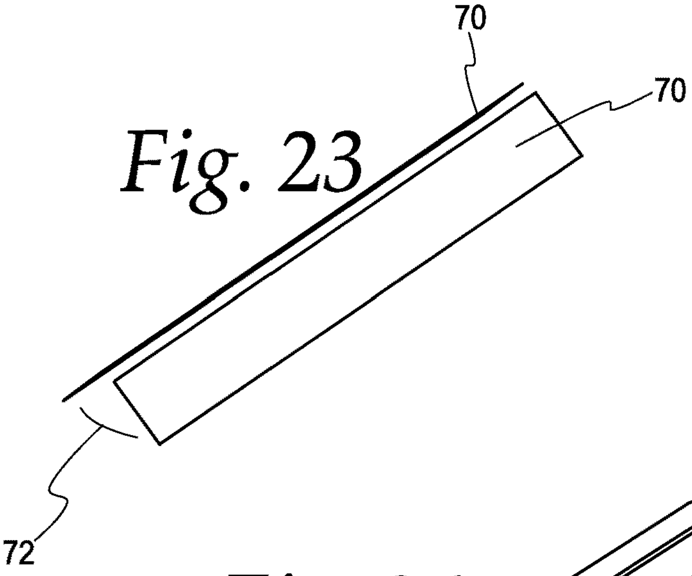
FIG. 23 is a perspective view of an alternate flat wing rod embodiment of the present disclosure.
Figure 24:
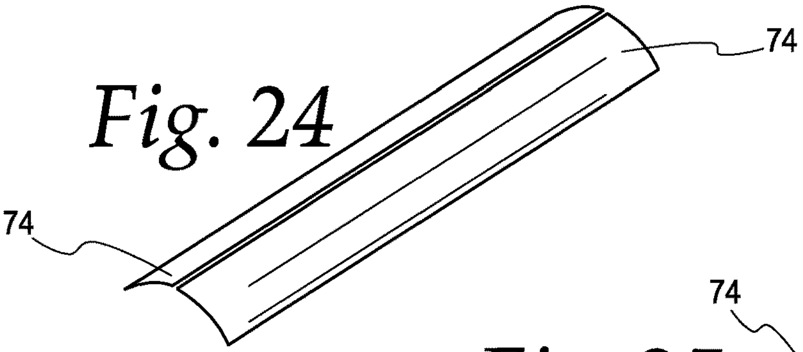
FIG. 24 is a perspective view of an alternate curved wing rod embodiment of the present disclosure.

Geometries that will allow a rod to function in a similar manner are possible without the need for a living hinge element. Examples of such will be shown and described with respect to FIGS. 23-26 and 28-30. Turning first to FIG. 23, a flat wing rod is shown. Two wing 70 members set at an angular 72 orientation to each other adds resistance to buckling. It will be appreciated that the wings herein may be connected at the handle and/or tip ends of the rod. Replacing the straight cross section wings with curved cross section wings 74, FIG. 24, will increase potential pushing forces in both bent and unbent states. The combination of the angular orientation of the wings to each other and the curved cross section of the wings increases the pushing load the rod can transit before buckling. As the rod bends, the local curved sections flatten then rebound back to the more stable original curved shape as the local rod section exits bends in the toilet trap.

Figure 25:
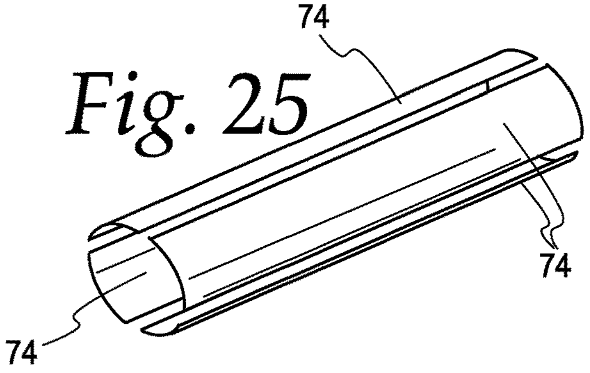
FIG. 25 is a perspective view of an alternate double curved wings rod embodiment of the present disclosure.

The pushing force provided by the rod can be significantly increased by increasing the number of wing elements. FIG. 25 illustrates such a double curved wings 74 embodiment. In addition to increasing the pushing force provided by the rod, this mirroring of the rod of FIG. 24 also significantly increases stability in such a free wing design, especially when it is subjected to off-center pushing forces. By eliminating the need for the extreme material bending in the living hinge a much stiffer material may be able to be used that will also increase the pushing force of a given sized rod. This multi-wing configuration may be useful when the size of the tube or trap that the rod needs to fit into is too small to allow simply making the two wing rod larger.

Figure 26:
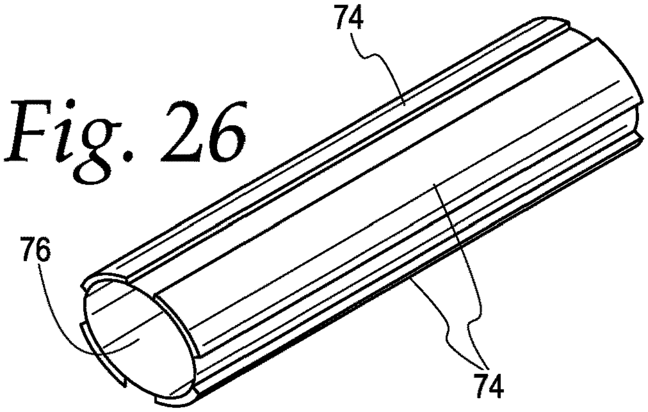
FIG. 26 is a perspective view of an elastomer filled rod embodiment of the present disclosure.

An alternate way to add lateral restraint is to connect the wings 74 with a compressible, low modulus of elasticity material, see FIG. 26. Such a filler 76 will stabilize the wing 74 geometry against sudden buckling yet be compressible enough to allow the overall geometry to flatten as it passes through the toilet trap bends. The filler 76 will then rebound the wings to the more stable as molded position as the local rod section exits the toilet trap bend. Such an embodiment has the potential to create a rod with a very high buckling force for a given cross sectional area. This would be most useful in applications requiring a very high pushing force in a small diameter passage or requiring a significantly longer flex section. One such application would be conduit chases in electrical vaults, etc. where rods of significant length may be desirable.

Figure 27:
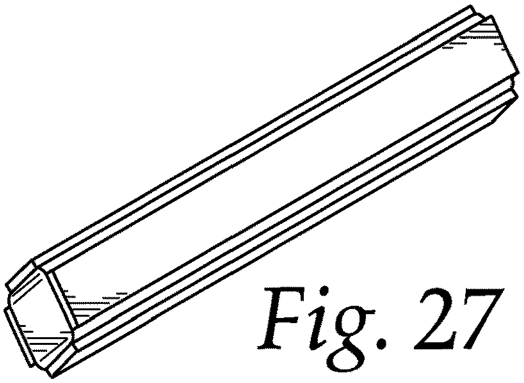
FIG. 27 is a perspective view of a hollow tube rod embodiment of the present disclosure.

Tubular shapes can withstand the highest longitudinal compressive forces before buckling for a given amount of a given material of any simple geometry. Thin wall tubes are very efficient in this regard. However, the thin wall tube shapes are prone to sudden buckling when exposed to side loads, off center pushing forces, or minor geometry variations such as dents. When transitioning into a bent or curved shape these shapes frequently experience kinking that prevents them from rebounding back to their original, as molded, shape. In the toilet trap application, this kinking can make it difficult to withdraw the rod from the toilet trap as the kinks tend to get caught at the trap bends or any other features in the trap. Once caught, significant additional force is frequently required to withdraw the rod from the toilet trap. This gives the user the impression that the rod is stuck. Thicker wall tubes are more tolerant to these conditions and can undergo some bending without experiencing the kinking that prevents rebounding to the original, as molded, shape. However, they are less cost effective from a material usage standpoint than thin wall tubes. In addition much higher pushing forces are required to force thicker wall tubes through a given bend in a tubular passage. Adding optional living hinge sections to the tubular shapes allows these shapes to flatten easier when bending and therefore avoid the kinking situation, provided that the sections between the living hinge sections will not kink in the specific application. The living hinge also allows rods with thick sections to be pushed through a given bend in a tubular passage with much lower pushing force. A square tubular living hinge hollow rod is shown in FIG. 27 with a simple flat thick section to demonstrate the concept as flat shapes will not kink during bending. These main thick sections could have curved or other cross section shapes so long as the chosen shape will not kink in the specific application.

Figure 28A:
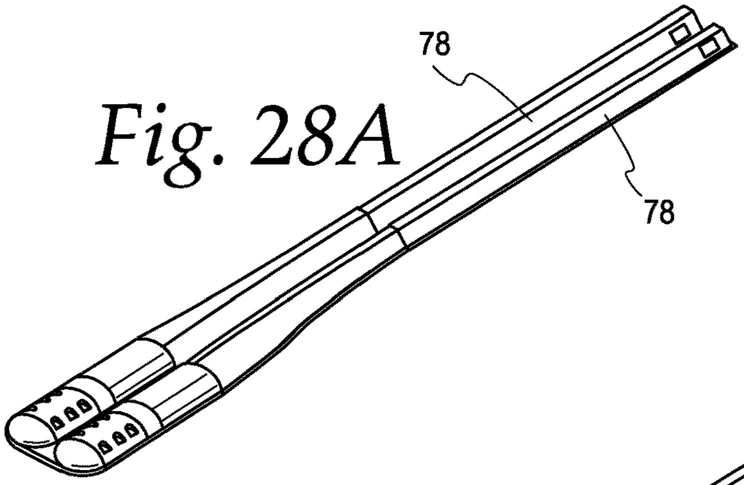
FIG. 28A is a perspective view of an alternate rod embodiment of the toilet rod assembly according to the principles of the present invention.
Figure 28B:
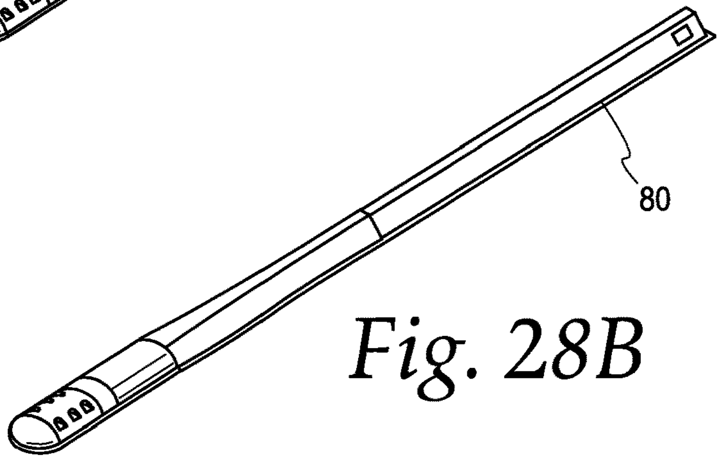
FIG. 28B is a perspective view of the assembly of FIG. 28A in the folded for use state.

As previously discussed, tubular shapes provide a high buckling stiffness along their axis for a given weight of material. This allows for a high pushing force for any given material cost. Unfortunately, tubular shapes, if not simple tubes, can prove to be difficult to mold. However, a tube-like structure can be obtained by molding a shape consisting of two halves 78 (FIG. 28A) of a tubular rod and then folding the shape to achieve the tube-like structure (FIG. 28B). A tube-like structure in the handle area 80 provides a handle that is more resistant to collapsing when squeezed during the pushing force.

Figure 29:
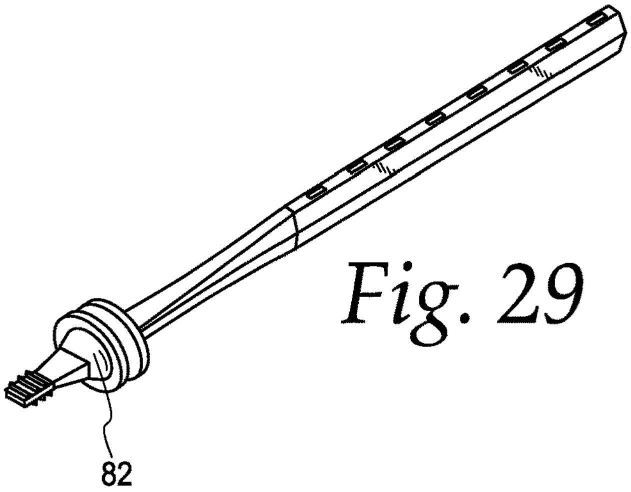
FIG. 29 is a perspective view of an alternate embodiment of the toilet rod assembly according to the principles of the present disclosure.
Figure 30:
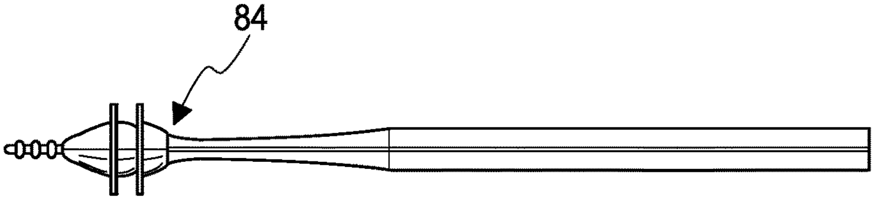
FIG. 30 is a side view of an alternate embodiment of the toilet rod assembly according to the principles of the present disclosure.

The embodiments as shown in FIGS. 29 and 30 combine the previously discussed concepts of a folded rod and cooperating tips to hold/retain the fold. Turning first to FIG. 29, the cone tip 82 is shown holding the rod in the folded position. This essentially holds the rod halves together without added fasteners or adhesives. The cones bias the disks and also hold the rod folded at the points of contact. It is the small end of the cone that holds the rod in the folded position. Turning next to FIG. 30, a tapered seat 84 on the cone engages a seat on the rod for longitudinal location and stabilization. This provides a means to retain the cones axially and radially on a folded rod. Further, tapering the mounting hub of the cone and assembling to a matching tapered mounting hub surface on the rod provides stability and longitudinal location positioning on the rod. In any event, it will be appreciated that other tip components may also be utilized to serve as retainers to hold the rod in the folded position.

A transverse perforated hinge rod embodiment is shown in FIG. 31. By way of background, as two plates bend, the inside of the plates become shorter while the outside of the plates become longer. This difference in length causes shearing stresses around the fold line. This stress can be relieved with elongated holes 86 positioned along the fold line which allow the upper and lower plates to move slightly with respect to each other. Relieving this stress reduces kinking during bending and allows smoother bending. This transverse perforated hinge allows some compliance between the upper portion and the lower portion of the rod during bending to prevent the local buckling and kinking that can result from the material on the outside of the bend wanting to stretch while the material on the inside of the bend will want to compress.

The crush boxes embodiment is illustrated in FIGS. 32A-D. In particular, depressions on the rod surfaces contact each other when the rod is folded into the closed position and can provide resistance to user induced squeezing forces. Rectangular boxes 88 are shown for illustration, but this function can be achieved by any shapes that approximately contact each other when the rod is in the closed position. The straight section of FIG. 32C show how having no space between 89 the crush box faces prevents user induced crushing from squeezing forces in the handle section. Similarly, the bent section of FIG. 32D show the space between 89 the crush box faces can limit flattening to preserve axial pushing force ability when the rod is bent to go around corners in flexible sections. It will be appreciated that both the crush boxes and tapered interlock features can be used in the same rod.

Figure 33:
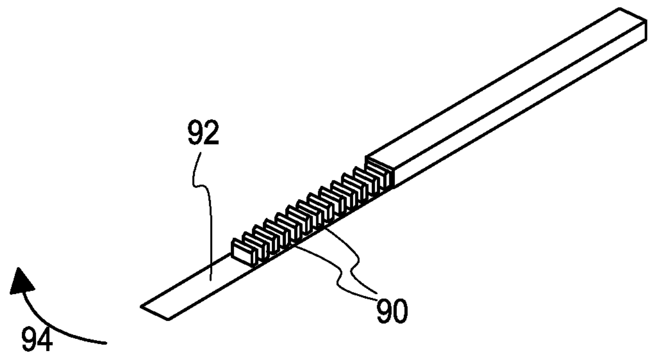
FIG. 33 is a perspective view of a bend limiting design on a flexible blade.

As mentioned, the crux of the disclosure remains the blades ability to traverse the drain and dislodge any blockage. More specifically, it is the stiff yet flexible characteristic of the blade that provides this feature. It has also been contemplated that there may be a desire or need to limit the bend or flex of the blade. As such, numerous embodiments addressing this desire will follow. A first embodiment is illustrated by the bend limiting box design of FIG. 33. By way of example, the flat blade of FIG. 33 includes box structures 90 on its top face 92. When the tips of the box structures contact one another during an upward bend 94, the bend is limited thereby. Essentially, adding box like structures to the flexible section of the rod will limit how far the flexible section of the rod can bend in various directions. Adding box like structures on both sides of a living hinge design, and taking advantage of draft can limit how flat the flexible section can go as it flattens about the living hinge when it encounters a bend. In any event, limiting how flat the rod can get increases the pushing force that the rod can exert before buckling.

Figure 34:
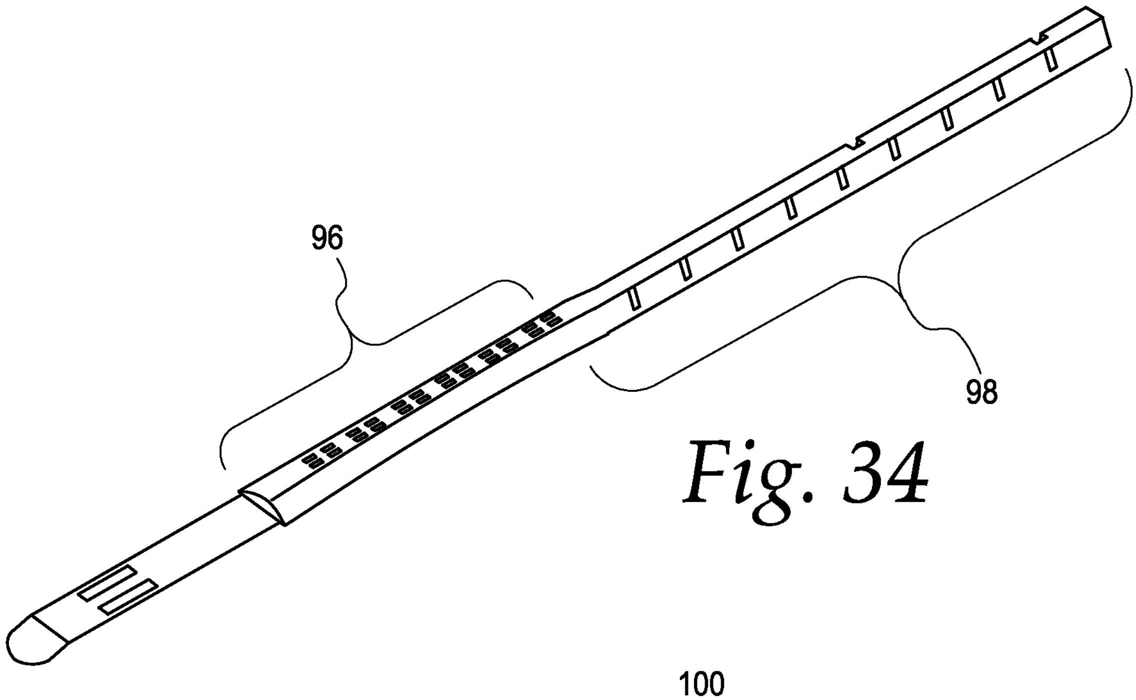
FIG. 34 is a perspective view of an alternate stiff butt section rod embodiment of the toilet rod assembly according to the principles of the present disclosure.

A stiff butt section rod embodiment is shown in FIG. 34. Since a portion of the handle end of the rod may never need to enter the trap, the handle end need not be flexible. Indeed, an improved pushing performance may be able to be achieved with more of the rod being inflexible. Such a design, while maintaining the prior discussed degree of flexibility, includes a flexible center section 96 like prior discussed rod profiles to provide flexibility to enter the trap and negotiate bends, and a more solid butt section 98, which may be cylindrical or rib reinforced for example, to increase buckling stiffness when pushing on the rod.

Figure 35:
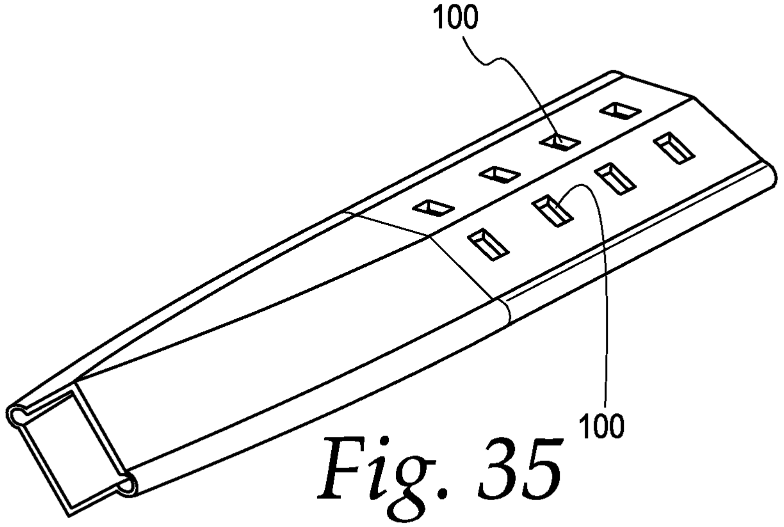
FIG. 35 is a perspective view of an alternate flattening limiter embodiment of the toilet rod assembly according to the principles of the present disclosure.

A flex flattening limiter rod embodiment is shown in FIG. 35. When the flex section of the rod bends and transitions to a flatter state, the opposing walls move closer together. This makes it easier for the flex section to bend but also reduces the pushing force that the flex section can transmit before buckling. When the faces of flattening limiters 100 come into contact during rod bending and flattening and limit how close the two opposing walls can come to each other. Indeed, there is a larger distance between wall sections when using flattening limiters 100 than the smaller distance between wall sections when not.

Accordingly, protrusions that limit how close the opposing walls of the flex section can come to each other when in a bent state (flattening limiters) will prevent the flex section from becoming entirely flat and help maintain some of the flex sections force transmitting ability.

Alternate embodiments of the blade tip have been contemplated. For example, an opened finger and/or closed fingered tip. Alternatively, fins or protrusions on the blade, which may be located on the sides, top and/or bottom and may aid in removing parts of the clog thereby reducing its size and/or tightness within the drain and/or create water sloshing or pressure and accordingly contributing to the clearing of the drain.

These alternate embodiments of the blade tips, as well as the other previously discussed tips, can be loosely classified as pushing tips. Alternatively, the tip may be designed to engage the clog and then pull, cut or shred as opposed to push. In particular, and for example, a perpendicular opposing teeth design, opposing hooks on one elongated side of the tip end, and a catch on a pre-bent tip. In any event, tips can be of any design and preferably focus on poking, pushing, grabbing and/or shredding the drain clogging materials.

The optional drain wall engaging member provides a pumping action to aid the tip in dislodging the clog. Essentially, a one-way valve is created. In order to accomplish this action, the tip end of the rod needs to create a seal within the toilet waste pipe (for example). Such a seal may be accomplished in a number of ways, including, but not limited to, an arrangement of disk(s), a sponge type seal, an arrangement of leaves/petals, a helix, multiple cup like designs and/or a funnel type design. Such seals and the like allow the adaptation of the wall engaging member to different size and shape traps and drains.

The disk arrangement has been previously shown and described with respect to FIGS. 1-5. The three-dimensional profile disk allows the disks to open when exposed to water pressure to better adapt to different trap profiles. Disks may be made from any suitable material, including fibrous pulp or pulp like materials including paper towel, or non-woven and woven substrates made with natural and man-made fibers, including paper substrates and fabrics. This embodiment (as well as others) may consist of pulp-based disks. As such, it will allow for three dimensional molded shapes and even more complex shapes when compared to flat paper stock. Additionally, the pulp material allows disks to be more pliable, more biodegradable, and encourages disposal after use.

Figure 36:
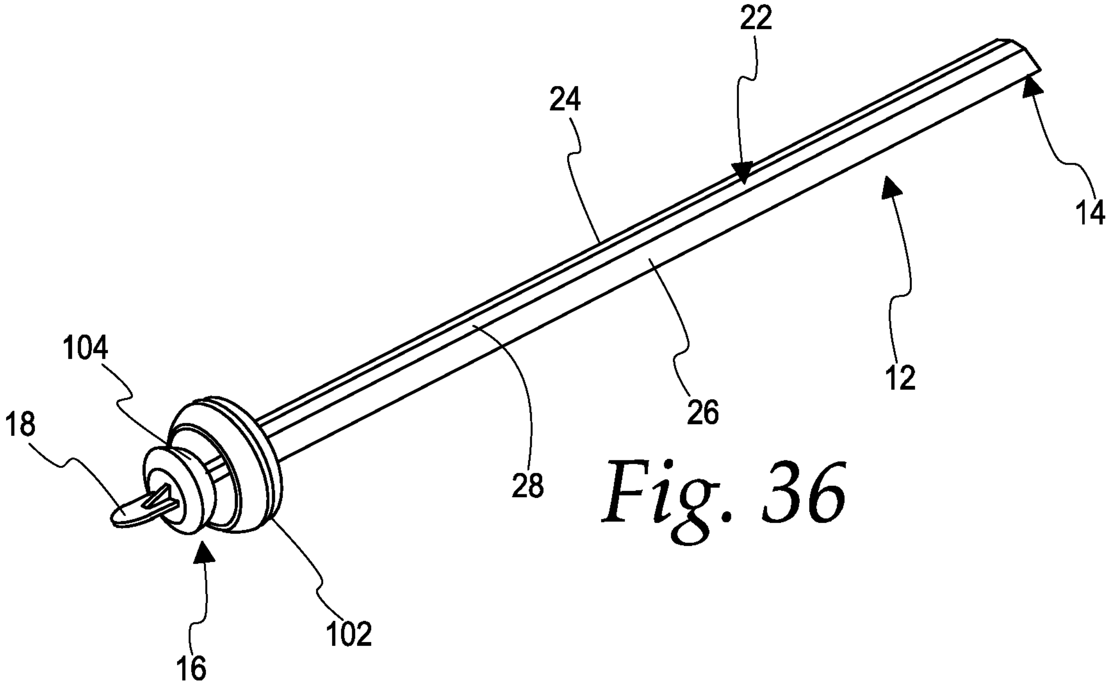
FIG. 36 is a frontal perspective view of a toilet rod assembly in an open position according to the principles of an embodiment of the present disclosure.

The sponge type seal, and in particular an example of a sponge seal foot valve design is shown and described as the wall engaging assembly in FIG. 36. It will be appreciated that the foot valve or check valve embodiments, like those disclosed in FIG. 36 and other Figures herein, are not limited to the specifically disclosed components. Rather it is the ability to push clogs by restricting reverse flow past the tips while allowing forward flow no matter what the geometry. While the embodiment of FIG. 36, and a number of alternate embodiments, may be described as so-called sponge seals, so long as the wall engaging member deforms to adapt to the trapway, the assembly need not necessarily comprise of a sponge or sponge type material. In any event, the wall engaging assembly of the embodiment of FIG. 36 includes a seal 102 and a plug 104. The seal 102 is preferably affixed to the blade 12 and deforms to adapt to the toilet drain trapway and seals there against. The plug 104 shuttles back and forth on the rod to allow flow and block against back flow thereby creating the pressure to dislodge clogs.

Figure 37A:
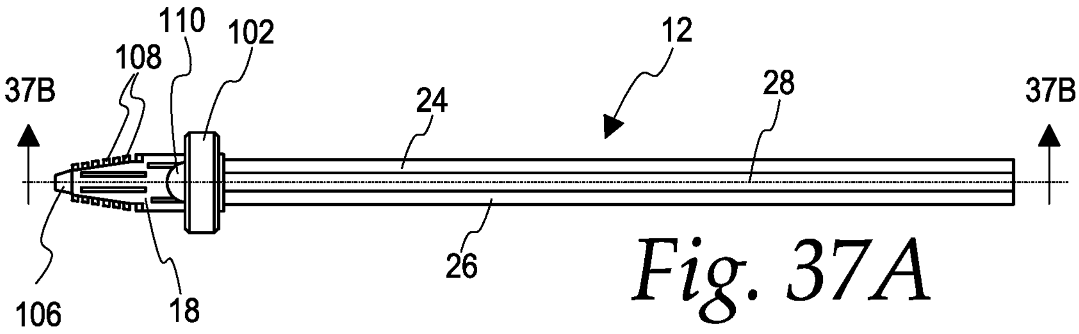
FIG. 37A is a top plan view of an alternate embodiment of the toilet rod assembly in a closed position according to the principles of the present disclosure.
Figure 37B:
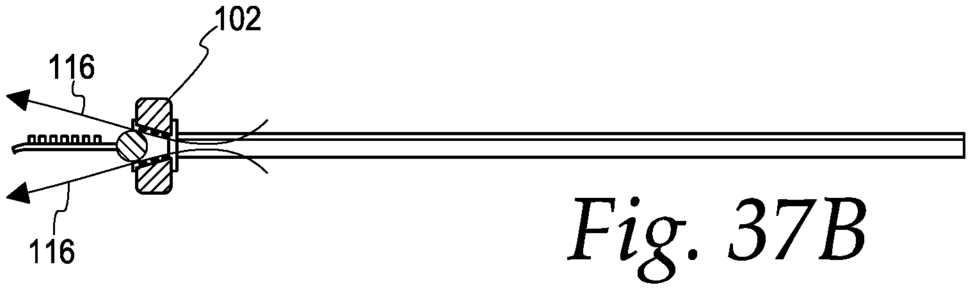
FIG. 37B is a cross-sectional view of the assembly taken along lines 37B-37B of FIG. 37A.
Figure 37C:
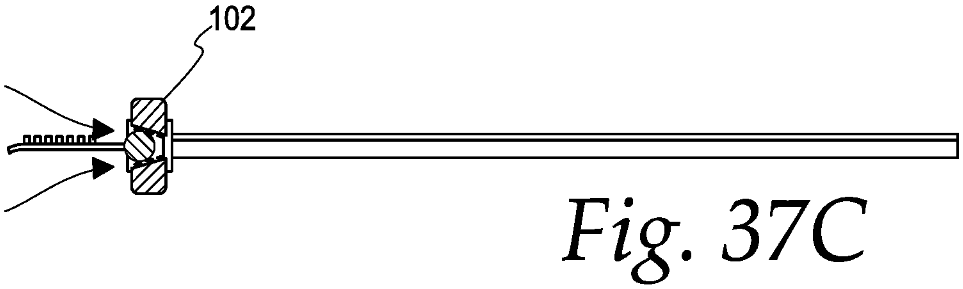
FIG. 37C is the assembly of FIG. 37B with the valve in a closed position.

There are alternate sponge type seals contemplated. Indeed, FIGS. 37A-37C illustrate a sponge sealed foot valve design utilizing a check ball. The toilet rod assembly includes a blade portion 12, a back end and a front end with a tip 18 having a curved (or cobra shaped) end 106 to help navigate bends and protrusions (or teeth) 108 on it angled sides. The blade portion 12 includes a living hinge comprising a right wing 24, a left wing 26 and a middle hinge 28. The wall engaging assembly of the embodiment of FIGS. 37A-37C includes a seal 102 and a check ball 110. The seal is preferably affixed to the blade and deforms to adapt to the toilet drain trap way and seals there against. The check ball 110 shuttles back and forth on the rod to allow flow and block against back flow thereby creating pressure to help dislodge clogs.

Figure 38A:
FIG. 38A is a top plan view of an alternate embodiment of the toilet rod assembly according to the principles of the present disclosure.
Figure 38B:
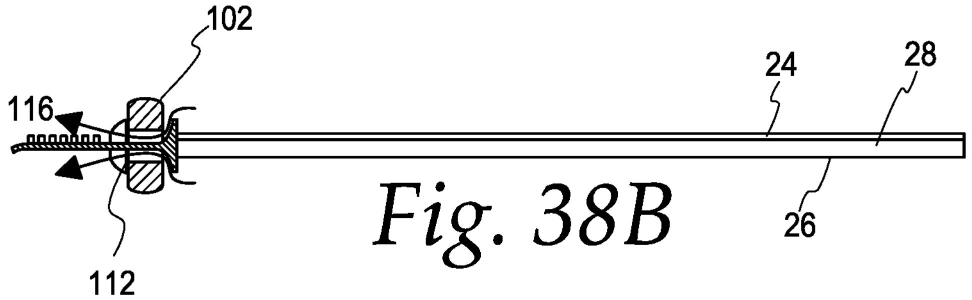
FIG. 38B is cross-sectional side view taken along lines 38B-38B of FIG. 38A.
Figure 38C:
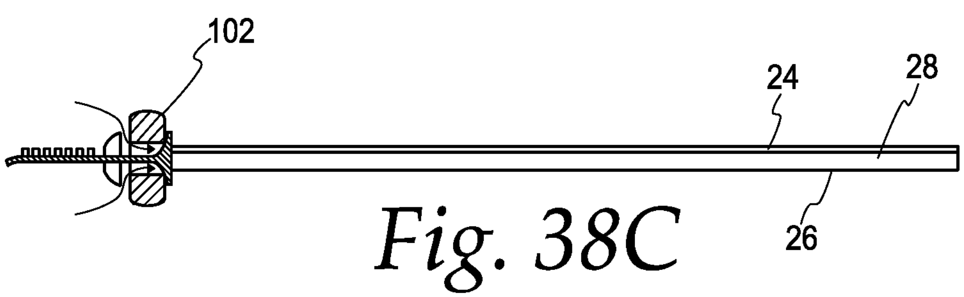
FIG. 38C is the assembly of FIG. 38B with the valve closed by backflow.

Another alternate sponge type seal wall engaging member is illustrated in FIGS. 38A-38C. In particular, a shuttle seal design is utilized therein. As before, the toilet rod assembly includes a blade portion, a back end and a front end with a tip 18. The blade portion includes a living hinge comprising a right wing 24, left wing 26 and a middle hinge 28. The wall engaging assembly of this embodiment includes a seal 102 and a rib 112 to stop the forward motion of the assembly and allow fluid flow. The rib 112 and back plate 114 are preferably affixed to the blade. The seal 102 deforms to adopt to the drain trap way and seals there against. The sponge seal also shuttles back and forth on the rod to allow forward flow 116 when the shuttle seal uncovers the holes in the back plate 114 and further allows flow around the rib 112, see FIG. 38B. The holes are covered, and backflow is sealed when the seal is against the back plate 114. In essence, the sponge seal of this embodiment doubles as the trap seal and as the flow check valve.

The seal and pumping action of the wall engaging member may further be accomplished via an expander-based design. The basic concept of this embodiment is illustrated in FIG. 39. In particular, a single flat elliptical disk 118 is located near the front end 16 of a flat rod 120. In use, the slow-moving rod of FIG. 39B does not create a pressure effect and accordingly remains compact for ease of trap navigation. By contrast, and as illustrated in FIG. 39D, a faster moving rod creates a velocity pressure 122 and bends the top petal up to fill up the trapway, create a seal, and accordingly create the clearing pressure in front of the rod.

FIGS. 40A and 40B illustrate another embodiment of an expander-based design. In particular, a pleated cylindrical or conical expander 124 is located near the front end of a rod with a blade 12 having a right wing 24, a left wing 26 and a living hinge 28. This embodiment further includes a tip having a curved end. FIG. 40A illustrates the expander 124 in the initial contracted condition, as shown by the small diameter 126 of FIG. 40A, for easy trapway traverse that allows forward flow 116 of water to flush the trap. FIG. 40B illustrates the expander 124 in an expanded condition, and larger diameter 128 that fits and seals the local trapway conditions and geometry. Essentially, the expander 124 expands on pressure 130 generating forward inserting stroke to create toilet clearing pressure and contracts on reverse withdrawing stroke to allow forward flow of water to flush the trap.

FIG. 40C illustrates the expander-based design of FIGS. 40A and 40B with an additional protecting cage component. This protector may include multiple fingers 125 surrounding the cupcake doily style expander 124. This design generates power while maintaining wall size adaptation in order to manipulate various trap/pipe sizes.

Other embodiments of an expander based design have been contemplated. In particular, a thick vane/thin web expander is located near the front end of the rod with a blade having a right wing, a left wing and a living hinge. Essentially, the thick vanes provide structure and strength while the flexible thin webs capture the pressure and allow the pressure generated to expand the tip to adapt to the trap diameter. Another embodiment of an expander based design includes an overlapping leaf expander located near the front end of the rod with a blade having a right wing, a left wing and a living hinge. See FIG. 40D. The expander, and its multiple leaf parts rotationally offset, in the initial compact shape, for easy trapway traverse. Multiple petals overlap to allow expansion when exposed to internal pressure generated by moving the rod forward in the trapway. The overlap of the petals allow a smaller diameter for easier trap entry while giving some expansion ability when exposed to internal water pressure. Essentially, the pressure expands the tip to adapt to the local shape of the trap and sealing occurs between the edges and adjacent bodies of the leaf parts.

Another embodiment of an expander based design includes a structure and web expander located near the front end of a rod with a blade having a tip with a curved end. The expander, including the external structure and flexible webbing, in the initial shape, is for easy trap entry. The expander, in an expanded shape, and larger diameter, is for adaptation to the toilet trap local shape. Essentially, the flexible web components between stiffer external structures captures the pressure on rapid forward movement of the rod and provides the sealing against the toilet trap during expansion.

A further embodiment of an expander based design includes a cone expander located near the front end of a rod with a blade having a tip with a curved end. In its initial shape the small diameter allows for easy trap entry. The expanded state adapts to variations in local trap geometry due to the forward pressure exerted on the rod. This embodiment may be formed from a simple molded cone. The cone is then slit so that it can be reformed for trapway traverse. Yet another embodiment of an expander based design includes a multi piece expander located near the front end of the rod with a blade having a right wing, a left wing and a living hinge. The expander design, and its individual snap on different sized expanders, in the normal and collapsed condition allow for ease in trapway navigation. On the other hand, in its expanded condition, the pressure conforms the design to the local trap geometry.

Compression type tips, those that would expand to compress against the toiler trap, have also been contemplated. For example, and turning first to FIG. 41, a stacked disk array tip is shown. The action of this stacked design is similar to a stack of patches used to swab the barrel of a gun or cannon, and the materials used allow for a biodegradable design. FIGS. 41A and 41B show a stacked array 132 of variable size disks 134. FIG. 41C illustrates a stacked array 132 of disks and appear to be one solid block of material, a non-woven wipe may be used, for example. While a stacked array with the disks spaced apart is shown for illustration purposes in FIG. 41D, it is the partially exploded array of FIG. 41E that best shows the variable sizes of the disks.

Figure 42A:
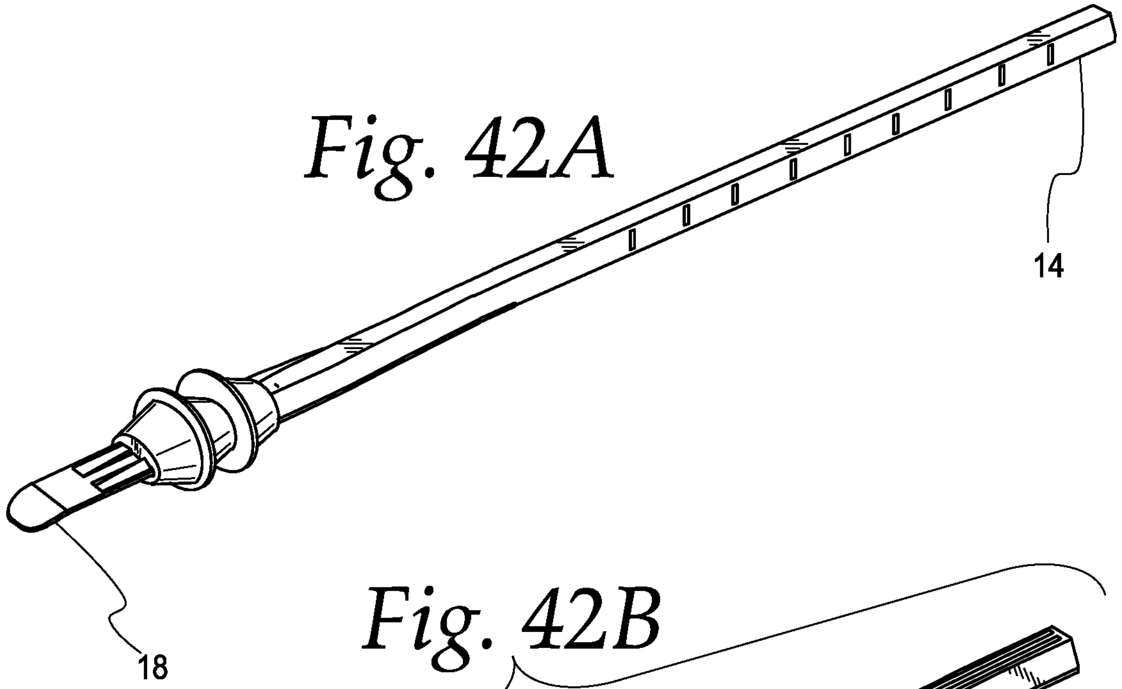
FIG. 42A is a perspective view of a disk cone array tip embodiment of the toilet rod assembly according to the principles of the present invention.
Figure 42B:
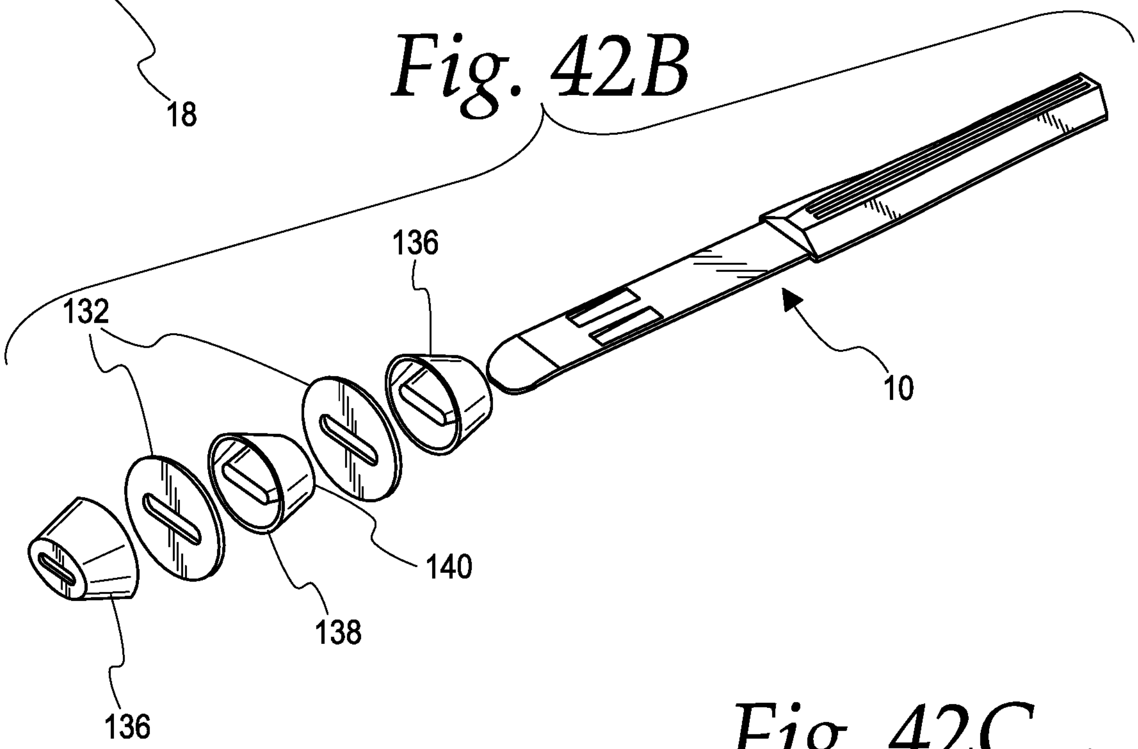
FIG. 42B is a partially exploded view of the assembly of FIG. 42A.
Figure 42C:
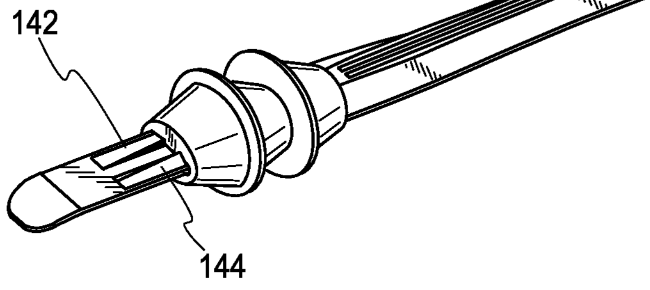
FIG. 42C is a perspective view of a fastening embodiment of the assembly of FIG. 42A.

The variable sized stack of disks shown in FIG. 41 will now be described with respect to the disk cone array tip embodiment of FIG. 42. The disk cone array of FIG. 42 includes various size flexible material disks that are stacked upon each other to create a stack with a deformable edge that can seal against the wall of the toilet trap while adapting to different trap sizes and shapes. Cone shaped spacers 136 are placed between stacks 132 of disks to reduce the number of disks required to get the desired spacing between the large diameter disks. The spacing between the disk stacks allows the disks to flop back and forth when needed and not bind against each other and create congestion when entering or leaving a toilet trap or when reversing the direction of the rod stroke. The large diameter 138 of the cone 136 is placed against the back side of a disk stack to give the disk stack enough stiffness to maintain its shape against the toilet trap wall and therefore generate pressure on the inward stroke of the rod. The small diameter 140 of the cone 136 is placed against the forward side of the disk stack to maintain spacing and to allow the flexible disks to fold forward when the rod is withdrawn allowing fluid to flow past the disks when the rod is being withdrawn. It will be appreciated that the disks may be pre-assembled onto a cartridge (as discussed in previous embodiments). The rod assembly includes a tip end 18 and a back end 14, and the disk cone array is affixed to the blade via any suitable means, including right 142 and left 144 snaps or other suitable fasteners or the like.

Figure 43:
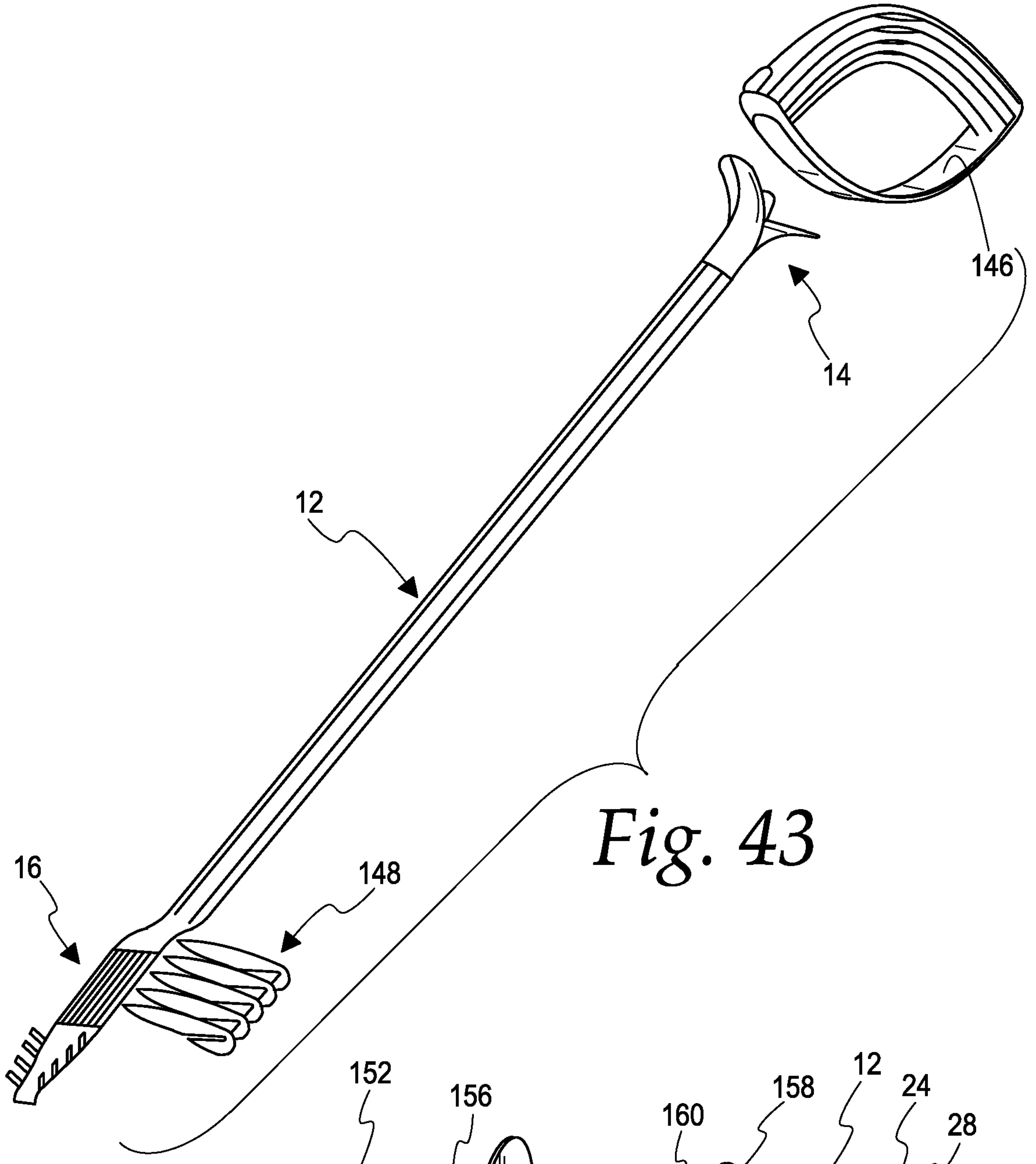
FIG. 43 is an exploded perspective view of an alternate embodiment of the toilet rod assembly according to the principles of the present disclosure.
Figure 44:
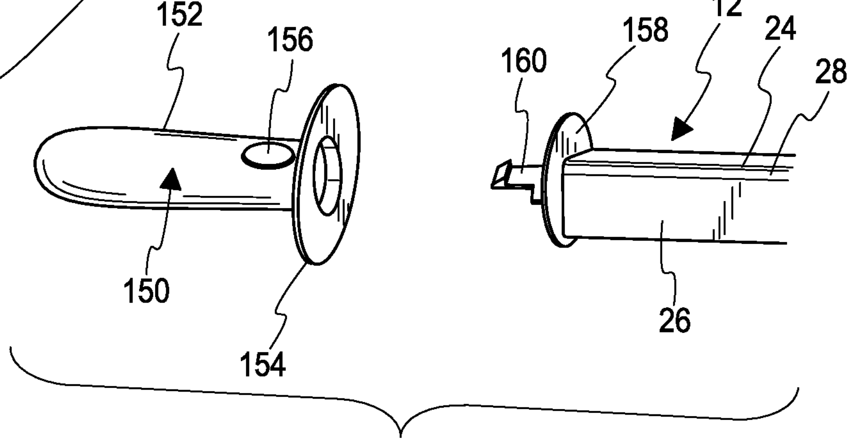
FIG. 44 is an enlarged view of decoupled handle and rod portion of an alternate embodiment of the present disclosure.

Due to the fact that the blade of the toilet rod assembly will likely become soiled, there are multiple embodiments wherein the blade can be easily discarded after a single, or perhaps several uses. Indeed, the blade portion may be made of a biodegradable material. Turning now to an alternate detachable handle toilet rod embodiment of FIG. 43, an optional handle 146 is shown decoupled from the rear end 14 of the blade 12. The front end 16 of this embodiment includes a one piece disk pack 148 that snaps onto the rod from the side. Accordingly, with the rod ejecting from the handle 146 it allows for a disposal of the rod and a retention of the handle. An alternate handle 150 is shown in FIG. 44. This handle 150 includes a grip 152, a shield 154 and a blade detachment button 156. The blade 12 includes a right wing 24, a left wing 26 and a living hinge 28 together with a handle attachment end 158 including a handle engager (latch) 160.

Figure 45A:
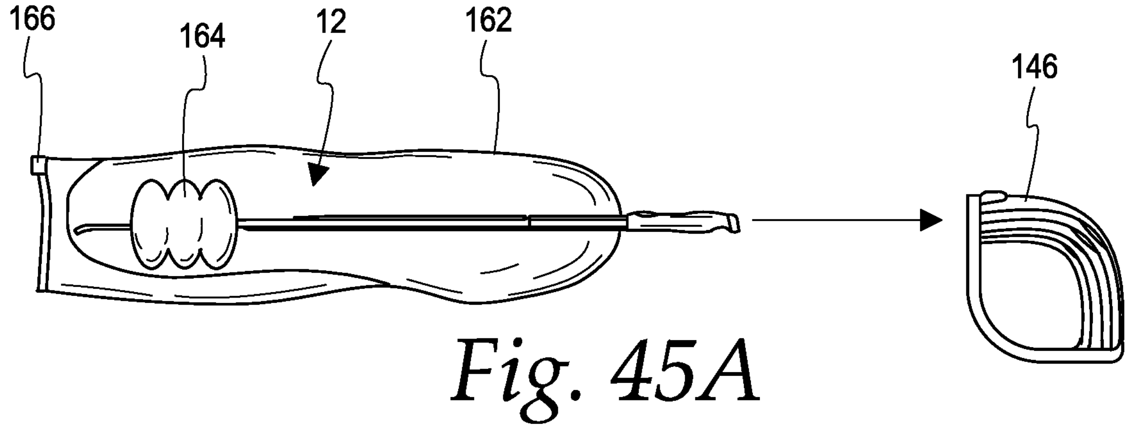
FIG. 45A is a side view illustration of a sanitary sleeve incorporated within the principles of a rod assembly of the present disclosure prior to use.
Figure 45B:
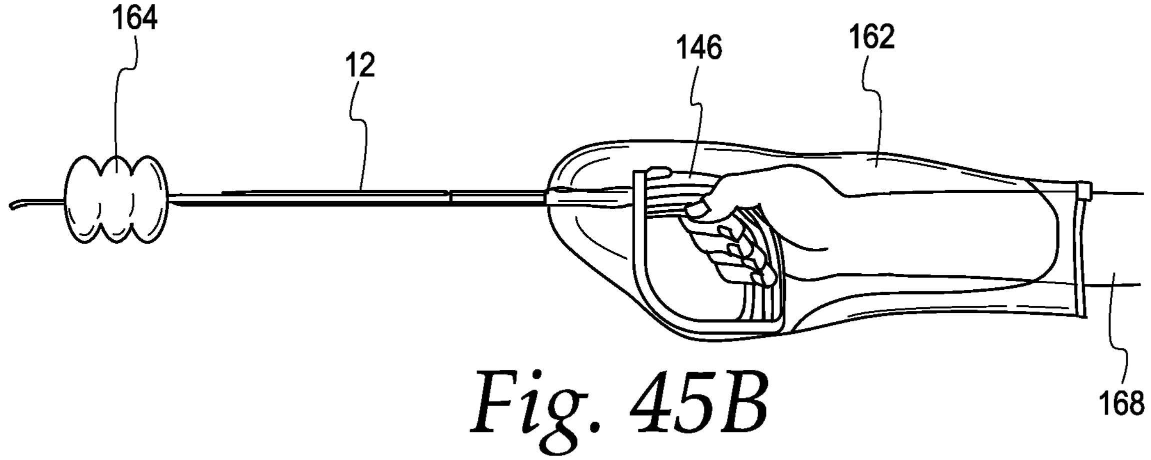
FIG. 45B is a side view of the sleeve of FIG. 45A during use.
Figure 45C:
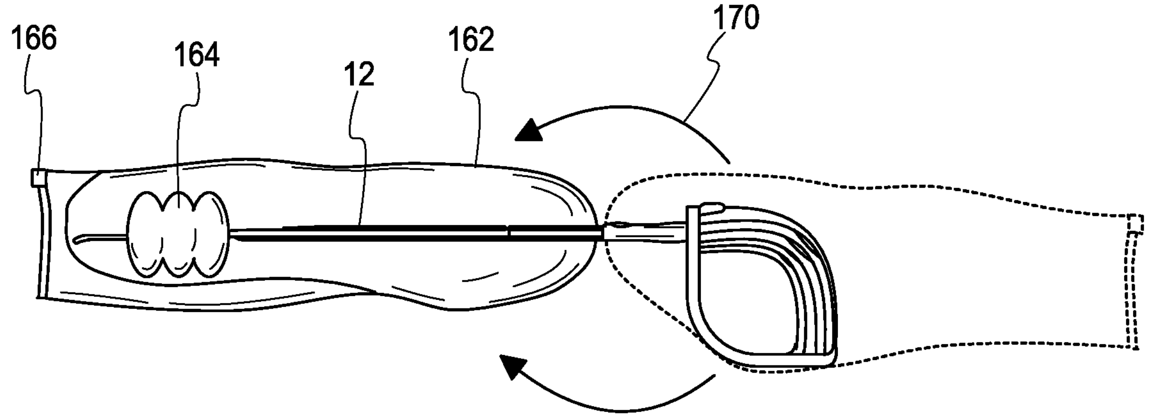
FIG. 45C is a side view of the sleeve of FIG. 45A after use.

It will be appreciated that some of the embodiments disclosed herein may inadvertently create a soiled rod upon removal of the trapway. Additionally, the elongated shape of the rod may not fit in conventional bathroom refuse containers. Accordingly, a sanitary enclosure design, as shown in FIG. 45, may be used. Referring to FIG. 45A, a sleeve or bag 162 encloses the blade 12, of the rod. The bag protects the wall engaging member, in this case a sponge seal 164, from moisture and humidity prior to use. The bag is opened just prior to use by opening a Ziploc 166 or the like and is pulled over the user 168. The bag 162 protects against splash during rod use (FIG. 45B) and is temporarily stored for later use. After the clog has been cleared, the bag 162 is rolled 170 onto the soiled blade 12, the Ziploc 166 is resealed and the bag 162 with the blade is ejected from the handle 146 for disposal.

Although the descriptions herein have focused on a specific drain, namely a toilet drain, the present disclosure and apparatus and devices may in fact be used on other clogged drains. Indeed, it is envisioned that almost any clogged drainage passageway in almost any type of plumbing fixture may be cleared with the teachings of this disclosure. It is further envisioned that these teachings may also be utilized in non-water way applications such as conduit, pipe, duct, race or other tubular clearing/cleaning operations.

The foregoing detailed description has been given for clearness of understanding only and no unnecessary limitations should be understood therefrom. Accordingly, while one or more particular embodiments of the disclosure have been shown and described, it will be apparent to those skilled in the art that changes and modifications may be made therein without departing from the invention if its broader aspects, and, therefore, the aim in the appended claims is to cover all such changes and modifications as fall within the true spirit and scope of the present disclosure.

What is claimed is:

1. A device for dislodging obstructions from tubular fixture having an interior wall, the device comprising:

a rod having a length, a user engageable end and a tip end;

a wall engaging member generally positioned near said tip end of said rod for creating a seal between said wall and said wall engaging member;

said wall engaging member comprises an expandable geometry having an expanded state to seal against said wall during user pushing of said rod and a collapsed state away from said wall during user pulling of said rod;

said rod is generally rigid along said length and provides localized flexibility for traversing a bend in said fixture; and said rod including a flexible member along a portion of said length, said flexible member connecting two or more sides to form an angle therebetween.

2. The device as defined in claim 1 wherein said flexible member is a living hinge.

3. The device as defined in claim 1 wherein said flexible member includes a thickness generally decreasing from said engageable end to said tip end.

4. The device as defined in claim 1 wherein said geometry is a generally conical shape.

5. The device as defined in claim 1 further comprising a sanitary enclosure for enclosing the device after use.

* * * * *